(12) United States Patent
Imaizumi et al.

(10) Patent No.: US 6,707,844 B1
(45) Date of Patent: Mar. 16, 2004

(54) SYNCHRONOUS CIRCUIT AND RECEIVER

(75) Inventors: Ichiro Imaizumi, Tokyo (JP); Osamu Sato, Tokyo (JP); Hisashi Kawai, Tokyo (JP); Tetsuhiko Miyatani, Tokyo (JP); Takahiro Todate, Tokyo (JP); Kouya Hoshina, Tokyo (JP)

(73) Assignee: Kokusai Electric Co., Ltd., Tokyo (JP)

( * ) Notice: Subject to any disclaimer, the term of this patent is extended or adjusted under 35 U.S.C. 154(b) by 0 days.

(21) Appl. No.: 09/481,943

(22) Filed: Jan. 13, 2000

(30) Foreign Application Priority Data

Jan. 14, 1999 (JP) ......................... P. 11-007453

(51) Int. Cl.[7] .............................................. H04B 1/707
(52) U.S. Cl. ........................ 375/148; 375/150; 375/152
(58) Field of Search ................................ 375/142, 143, 375/145, 148, 149, 150, 152; 370/320, 335, 342, 441

(56) References Cited

U.S. PATENT DOCUMENTS 5,491,718 A * 2/1996 Gould et al. ................ 370/335
5,910,948 A * 6/1999 Shou et al. .................. 370/335
6,205,168 B1 * 3/2001 Somayazulu ................ 375/149
6,385,232 B1 * 5/2002 Terashima ................... 375/149

FOREIGN PATENT DOCUMENTS

JP          10-145333      5/1998
JP          11-74835       3/1999

OTHER PUBLICATIONS

Yukiji Yamauchi, "Spread Spectrum Communication", by Publication Bureau of Tokyo Denki Univ., 1994 with English abstract.

* cited by examiner

Primary Examiner—Don N. Vo
(74) Attorney, Agent, or Firm—Jacobson Holman PLLC

(57) ABSTRACT

There is disclosed a synchronous circuit and a receiver in which a long code for use in communication can be determined in a short time, and circuit scale can be reduced. Upon receiving input of a data stop signal from a control unit, a matched filter continues to hold the signal held at the time, performs a product sum operation of a spreading code successively inputted from a spreading code generator and the held signal, and successively outputs correlation signals in the synchronous circuit and the receiver.

11 Claims, 13 Drawing Sheets

(a)

(b)

(PRIR ART)

(PRIR ART)

(PRIR ART)

(PRIR ART)

SYNCHRONOUS CIRCUIT AND RECEIVER

BACKGROUND OF THE INVENTION

1. Field of the Invention

The present invention relates to a synchronous circuit and a receiver for performing CDMA communication, which is one type of communication systems of a cellular phone, and the like, particularly to a synchronous circuit and a receiver which can determine a long code for use in communication in a short time, and receive signals.

2. Description of the Related Art

In the communication in which a code divisional multiple access (CDMA) system is employed, in order to reduce the influence of phasing, and meet the request for capacity enhancement, a specification called a wide band CDMA (W-CDMA) is proposed.

There are several codes for use in actual communication. In those codes, there are 512 codes for initial synchronizing in a base station, and the codes are divided into 16 groups. Specifically, 32 types of codes belong to each group.

Furthermore, a group short code indicating each group is allotted.

When power is supplied, a mobile station which performs the communication of the W-CDMA system captures a first perch channel to specify a base station with which the communication is performed.

As shown in FIG. 10(c), the first perch channel has an entire length of ten symbols, and is constituted of four pilot symbols, five logic channel symbols, and a first long code mask symbol with a length of one symbol. FIG. 10 is an explanatory view showing the signal formal of the W-CDMA system.

Additionally, the pilot symbols and logic channel symbols will generically be referred to as "information symbols" hereinafter. The first long code mask symbol is diffused with an internationally unified short code.

Moreover, as shown in FIG. 10(d), a second perch channel is a channel for transmitting only a second long code mask symbol with a length of one symbol. The second long code mask symbol is diffused with specific one short code among the predetermined 16 types of group short codes.

Here, the first long code mask symbol and the second long code mask symbol are transmitted with the same phase.

Additionally, when the first perch channel is regarded as one unit (one slot time), 16 slot time units are referred to as a radio frame. The long code is repeated with the radio frame unit. Moreover, the unit of 64 radio frames is referred to as a super frame.

Here, the constitution for performing reception of a conventional mobile station will concretely be described.

A circuit (synchronous circuit) for capturing synchronization and receiving signals in the conventional mobile station is, as shown in FIG. 11, mainly constituted of a radio unit 1 for converting an incoming signal on an antenna to a base band signal; an A/D converter 2 for converting the signal inputted from the radio unit 1 into a digital signal; a spreading code generator 3 for generating a designated spreading code; a matched filter 4 for despreading the signal successively inputted from the A/D converter 2 with the spreading code inputted from the spreading code generator 3, and outputting a correlation signal; a profiler unit 5 for outputting a signal indicative of a signal incoming timing (path position timing) based on the correlation signal outputted from the matched filter 4; a plurality of correlators 6 for despreading the signal inputted from the A/D converter 2 with the spreading code inputted from the spreading code generator 3 over one symbol time from a plurality of path position timings inputted from the profiler unit 5, and outputting the correlation signals; a RAKE synthesizing unit 7 for RAKE-synthesizing the correlation signals outputted from the plurality of correlators 6; a decoder 8 for reproducing the original signal from the RAKE-synthesized signal; a voice CODEC 9 for converting the reproduced signal to a voice signal; and a controller 10 for controlling each unit. Additionally, the matched filter 4, profiler unit 5, and correlators 6 are collectively referred to as "despreading means" in the following description. FIG. 11 is a constitution block diagram of a conventional synchronous circuit.

Here, the matched filter 4 is, as shown in FIG. 12, basically constituted of a plurality of sample hold circuits 41, multipliers 42 disposed for the sample hold circuits 41, and an adder 43. FIG. 12 is a constitution block diagram of the matched filter in the conventional mobile station synchronous circuit.

Each component of the matched filter 4 shown in FIG. 12 will concretely be described. There are, for example, the number of chips per symbol×the number of over-samplings of sample hold circuits 41, which are connected to multiple stages. A first-stage sample hold circuit 41 holds the CDMA modulated signal inputted from the outside for a time of one chip time/the number of over-samplings, and outputs the signal to the next sample hold circuit 41.

Moreover, the subsequent sample hold circuit 41 similarly holds the signal inputted from the previous-stage sample hold circuit 41 for the time of one chip time/the number of over-samplings, and outputs the signal to the next sample hold circuit 41.

The multiplier 42 multiplies the signal held by the corresponding sample hold circuit 41, and the spreading code inputted from the outside, and transmits an output to the adder 43.

The adder 43 adds all the signals inputted from the multipliers 42 together, and transmits a correlation output to the outside.

Additionally, the operation performed by the multipliers 42 and the adder 43 will hereinafter be referred to as "product sum operation".

Specifically, for the matched filter 4 in the conventional mobile station, a plurality of sample hold circuits 41 successively take the CDMA modulated input signals, and hold one symbol of information. The multipliers 42 multiply the separately inputted spreading codes and the signals held by the corresponding sample hold circuits 41, and the adder 43 adds multiplication results to output the correlation output.

When the controller 10 specifies, for example, the group short code based on the signal of the correlation output inputted from the matched filter 4, and obtains the long code for use in communication, a processing shown in FIG. 13 is performed. FIG. 13 is a flowchart showing the processing in the control unit 10 from when the group short code is specified until the long code is obtained.

As shown in FIG. 13, the controller 10 first detects whether it is synchronized with a slot (S1). When it is not synchronized (No), processing S1 is repeated, and is on standby until the synchronization is established.

Moreover, when the synchronization is established in the processing S1 (Yes), the group short code is successively set to the spreading code generator 3 (S2), and the spreading code generator 3 is allowed to generate the set group short code.

Subsequently, the controller 10 is on standby until the long code mask symbol is received (S3). When the long code mask symbol is received, the correlation output outputted from the matched filter 4 is checked, and it is judged whether or not correlation is obtained (S4).

Then, when no correlation is obtained (No), the processing returns to S2, thereby continuing.

Moreover, when the correlation is obtained in the processing S4 (Yes), the processing shifts to S5.

Subsequently, the controller 10 successively sets the code belonging to the group short code specified in the processing S2 to S4 to the spreading code generator 3 (S5), thereby allowing the spreading code generator 3 to output the code.

The controller 10 is on standby until the pilot symbol is received (S6), upon receiving the pilot symbol, checks the correlation output outputted by the matched filter 4, and judges whether the correlation is obtained (S7).

Subsequently, when the correlation is not obtained in the processing S7 (No), the processing returns to S5, thereby continuing. When the correlation is obtained (Yes), the long code indicated by the code having obtained the correlation is determined as the long code for use in communication.

Moreover, FIG. 11 shows a plurality of antennas, radio units 1, A/D converters 2, and despreading means, which means that the signals are received from a plurality of branches.

Furthermore, only a single correlator 6 is shown in each despreading means, but actually, each branch is provided with a plurality of correlators 6 in order that incoming signals passed through a plurality of paths are synthesized and RAKE synthesis is performed to enhance the reception signal intensity.

Since the RAKE synthesis is described in pages 143 and 144 of "Spread Spectrum Communication" authored by Yukiji Yamauchi and published by Publication Bureau of Tokyo Denki University in 1994, the detailed description thereof is. omitted.

Furthermore, as not shown in FIG. 11 or 12, each matched filter 4 is in some cases provided with a register which temporarily holds the spreading code inputted from the spreading code generator 3.

The operation of the conventional mobile station synchronous circuit will next be described.

First, the receiving unit 1 receives the first perch channel from the incoming signal of the antenna, and the A/D converter 2 converts the signal to a digital signal.

Subsequently, the despreading means performs the despreading of the digital signal, and correlates/detects the first long code mask symbol. Since the signal format of the first perch channel has a length of ten symbols, it takes ten symbols at maximum until this correlation detection is obtained. A period in which a processing of correlating/ detecting the first long code mask symbol is performed is hereinafter referred to as "first phase".

When the first long code mask symbol can be correlated/ detected from the first perch channel, the despreading means reverse-diffuses and correlates/detects the second long code mask symbol received with the same phase as that of the first long code mask symbol with each of 16 types of predetermined group short codes, and specifies the group short code. Time of 16 slots at maximum is required until this group short code can be specified. A period until the group short code is specified is hereinafter referred to as "second phase".

When the group short code can be specified, the despreading means successively reverse-diffuses the pilot symbol with 32 long codes belonging to the group indicated by the specified group short code.

Here, since each of 32 long codes has a length of 16 symbols ,the codes for diffusing one pilot symbol are codes which start from the 16 specific phases.

Specifically, since the despreading means needs to successively change 16 phases and calculate the correlation of 32 spreading codes and the pilot symbol, 32×16 =512 slot time is required. A period in which a processing of specifying the long code for use in communication is performed is hereinafter referred to as "third phase".

Since one slot time is 0.625 milliseconds, it takes 16×0.625=10 milliseconds to specify the group short code, and it takes 512×0.625=320 milliseconds to specify the long code for use in actual communication. Specifically, time of 10+320=330 milliseconds is required until the long code for use in communication is obtained.

The conventional receiver will next be described. Since the conventional receiver has the same constitution as that of the conventional synchronous circuit, it will be described with reference to FIG. 11.

As shown in FIG. 11, the conventional receiver is basically constituted of the radio unit 1, A/D converter 2, spreading code generator 3, two despreading means, and RAKE synthesizing unit 7.

Additionally, the despreading means is constituted of the matched filter 4, profiler unit 5, and the number of correlators 6 corresponding to the number of paths to be RAKE-synthesized.

Moreover, in order to receive the signals from two independent antennas for RAKE synthesis, there are two systems (two branches) of the radio unit 1, A/D converter 2, and two despreading means.

Additionally, since the operation of each component is the same as that of the above-described synchronous circuit, the description thereof is omitted.

The operation of the conventional receiver will next be described.

The radio unit 1 of each branch receives the incoming signal of the antenna, and outputs the signal to the A/D converter 2. The A/D converter 2 in turn converts the received signal to the digital signal and outputs the signal to the matched filter 4 and correlators 6.

On the other hand, the spreading code generator 3 generates the long code specified by the synchronous circuit, and transmits outputs to the matched filter 4 and correlators 6.

Subsequently, the matched filter 4 reverse-diffuses the digital signal inputted from the A/D converter 2 with the long code outputted by the spreading code generator 3 to generate a delay profile, and the profiler unit 5 detects and outputs a plurality of path position timings from the delay profile.

Then, the correlator 6 having received the input of the path position timing reverse-diffuses the digital signal inputted from the A/D converter 2 with the long code outputted by the spreading code generator 3 at the timing, and outputs the signal to the RAKE synthesizing unit 7.

Subsequently, the RAKE synthesizing unit 7 RAKE-synthesizes the signal to output demodulated data.

Here, the RAKE synthesizing unit 7 usually receives the input of reverse-diffused signal from each of two branches to perform the RAKE synthesis.

Additionally, the reason why each branch is provided with two despreading means is that when hand-over is performed moving between cells, the individual physical channel data need to be demodulated to establish synchronization with the signal of the base station as the addressee of the hand-over.

In the above-described conventional mobile station synchronous circuit, 330 milliseconds are required until the long code for use in communication with one base station is determined, which raises a problem that too much time is required until the communication can be started.

Furthermore, according to the specification, there is a restriction that three seconds or less should be taken until the communication can be performed. On the other hand, the long code for use in communication with eight adjacent base stations needs to be determined. Since this takes as much as about 2.6 seconds (330 milliseconds×8), there arises a problem that even when the determination of the long code is unsuccessful, the long code cannot substantially be determined again.

Furthermore, since the conventional receiver is constituted by considering the hand-over or the RAKE synthesis, the circuit scale is enlarged, and the power consumption is disadvantageously increased.

SUMMARY OF THE INVENTION

An object of the present invention is to provide a synchronous circuit and a receiver in which a long code for use in communication can be determined in a short time, and circuit scale can be reduced.

According to the present invention, there is provided a synchronous circuit which performs correlating operation of a received signal and a spreading code to perform communication. When a long code is specified, a received long code mask symbol remains to be held over a given time, candidates for a plurality of spreading codes are successively selected, and correlation between the selected spreading code and the held long code mask symbol is successively calculated, so that the long code for use in communication can be determined in a short time.

Moreover, according to the present invention, in the synchronous circuit, the specifying of the long code as the spreading code for use in communication comprises remaining to hold a part of the signal diffused with the long code among the received signals over a given time, and changing a phase and successively calculating the correlation with the held pilot signal with respect to each of a plurality of long codes belonging to a group indicated by a group short code with the held pilot signal, so that the long code for use in communication can be determined in a short time.

Furthermore, according to the present invention, there is provided a synchronous circuit which comprises a radio unit for converting a signal coming in an antenna to a base band signal, an A/D converter for converting the signal inputted from the radio unit to a digital signal, a spreading code generator for generating a set spreading code, a matched filter for outputting a correlation signal from the digital signal inputted from the A/D converter and the spreading code inputted from the spreading code generator, and a control unit for controlling each unit. The matched filter comprises a plurality of sample hold circuits connected to multiple stages for successively transmitting data successively inputted from the A/D converter to a subsequent stage and storing the data, and for stopping the storage of newly inputted data, and continuing to hold the data held at the time while input of data stop signal is received from the control unit to stop the data storage; multipliers disposed for the sample hold circuits for performing multiplication with the corresponding spreading code inputted from the spreading code generator to transmit an output; and one adder for adding and outputting multiplication result signals inputted from the multipliers. Upon correlation/detection of a first long code mask symbol, at a timing when reception of a second long code mask symbol received with the same phase as that of the first long code mask symbol is completed, the control unit outputs the data stop signal to the matched filter, successively sets candidates for a plurality of group short codes to the spreading code generator, checks the correlation signals outputted by the matched filter with respect to the plurality of group short codes, determines that correlation is obtained, and stops the output of the data stop signal. At a timing when reception of a symbol diffused with the long code received with the phase immediately after the first long code mask symbol is completed, the control unit outputs the data stop signal to the matched filter successively sets a plurality of long codes belonging to the group indicated by the group short code to the spreading code generator with respect to each long code by changing the phase, checks the correlation signals outputted by the matched filter with respect to the plurality of long codes started from a plurality of phases, determines that the correlation is obtained, and specifies the long code having obtained the correlation as the long code for use in communication, so that the long code for use in communication can be determined in a short time.

Furthermore, according to the present invention, there is provided a synchronous circuit which comprises a radio unit for converting a signal coming in an antenna to a base band signal, an A/D converter for converting the signal inputted from the radio unit to a digital signal, a spreading code generator for generating a set spreading code, a matched filter for outputting a correlation signal from the digital signal inputted from the A/D converter and the spreading code inputted from the spreading code generator, and a control unit for controlling each unit.

The matched filter comprises a memory for holding digital signal data inputted from the A/D converter over recent one symbol time, and continuing to hold the data held at the time while receiving the input of the data stop signal for stopping data taking from the control unit; and a product sum operator for performing product sum operation of the data stored in the memory and the spreading code inputted from the spreading code generator with the matched phase. Upon correlation/detection of a first long code mask symbol, at a timing when reception of a second long code mask symbol received with the same phase as that of the first long code mask symbol is completed, the control unit outputs the data stop signal to the matched filter, successively sets candidates for a plurality of group short codes to the spreading code generator, checks the correlation signals outputted by the matched filter with respect to the plurality of group short codes, determines that correlation is obtained, and stops the output of the data stop signal. At a timing when reception of a symbol diffused with the long code received with the phase immediately after the first long code mask symbol is completed, the control unit outputs the data stop signal to the matched filter, successively sets a plurality of long codes belonging to a group indicated by the group short code to the spreading code generator with respect to each long code by changing the phase, checks the correlation signals outputted by the matched filter with respect to the plurality of long codes started from a plurality of phases, determines that the correlation is obtained, and specifies the long code having obtained the correlationas the long code for use in communication, so that the long code for use in communication can be determined in a short time.

Moreover, according to the present invention, in the above-described synchronous circuit, when the spreading code for use is specified from the plurality of candidates, the control unit divides all the spreading codes as the candidates with a specific length, selects and synthesizes one spreading code from all the divided spreading codes, and sets the synthesized and obtained spreading code to the spreading code generator. The matched filter performs the product sum operation of digital signal data inputted from the A/D converter and the synthesized spreading code, calculates a partial correlation, and outputs the correlation signal, so that the long code for use in communication can be determined in a short time.

Furthermore, according to the present invention, in the above-described synchronous circuit, when the spreading code for use is specified from the plurality of candidates, the control unit divides the spreading codes as the candidates into a plurality of sets, divides all the spreading codes of each set into specific lengths, selects and synthesizes one a spreading code from the divided spreading codes, and sets the synthesized and obtained spreading code to the spreading code generator. The matched filter performs the product sum operation of the digital signal data inputted from the A/D converter and the synthesized spreading code, calculates a partial correlation, and outputs the correlation signal, so that the long code for use in communication can be determined in a short time.

Additionally, according to the present invention, there is provided a receiver which comprises: a plurality of data memories for detecting timings of a plurality of delayed incoming paths based on a received signal, and storing the signal received from the timing of each path as digital signal data; and means for despreading the data stored in each of the plurality of data memories in a time division manner. As the means, either one of a matched filter, a sliding correlator, and an inner product unit is selectively used, or all of them are used, so that the circuit scale is reduced, and the power consumption can be curtailed.

Moreover, according to the present invention, there is provided a receiver which comprises: a plurality of radio units provided with a plurality of antennas and disposed for the plurality of antennas for receiving signals coming in the antennas, and outputting base band signals; a plurality of A/D converters disposed for the radio units for converting the base band signals outputted from the corresponding radio units to digital signals; a spreading code generator for generating a spreading code; a plurality of profile means disposed for the A/D converters for despreading the received signals in accordance with the spreading code inputted from the spreading code generator to generate delay profiles, and holding the signals outputted by the A/D converters from timings of a plurality of path positions specified by the delay profiles; a change-over switch for selecting one profile means from the plurality of profile means; a control unit for changing the change-over switch at a certain interval in a time division manner in a given time; an inner product unit for successively performing product sum operation of the signals held by the profile means selected by the change-over switch and the spreading code inputted from the spreading code generator to transmit an output; and a RAKE synthesizing unit for RAKE-synthesizing the signals inputted from the inner product unit, so that the circuit scale is reduced, and the power consumption can be reduced.

Furthermore, according to the present invention, there is provided a synchronous circuit which comprises a radio unit for converting a signal coming in an antenna to a base band signal, an A/D converter for converting the signal inputted from the radio unit to a digital signal, a spreading code generator for generating a set spreading code, a matched filter for outputting a correlation signal from the digital signal inputted from the A/D converter and the spreading code inputted from the spreading code generator, and a control unit for controlling each unit. The matched filter comprises a plurality of sample hold circuits connected to multiple stages for successively transmitting data successively inputted from the A/D converter to a subsequent stage in a chip unit and storing the data; a switch for outputting the digital signal outputted by the A/D converter to the front-stage sample hold circuit among the sample hold circuits while receiving no input of data stop signal for stopping data taking from the control unit, and for outputting the digital signal outputted by the rearmost-stage sample hold circuit among the sample hold circuits to the front-stage sample hold circuit in the chip unit while receiving the input of data stop signal, to successively change the phase of the data stored in the sample hold circuit; multipliers disposed for the sample hold circuits for performing multiplication with the corresponding spreading code inputted from the spreading code generator; and one adder for adding and outputting multiplication result signals inputted from the multipliers. Upon correlation/detection of a first long code mask symbol, at a timing when reception of a second long code mask symbol received with the same phase as that of the first long code mask symbol is completed, the control unit outputs the data stop signal to the matched filter, successively sets candidates for a plurality of group short codes to the spreading code generator, checks the correlation signals outputted by the matched filter with respect to the plurality of group short codes, determines that correlation is obtained, and stops the output of the data stop signal. At a timing when reception of a pilot symbol received with the phase immediately after the first long code mask symbol is completed, the control unit outputs the data stop signal to the matched filter, successively sets a plurality of long codes belonging to a group indicated by the group short code to the spreading code generator, checks the correlation signals inputted from the matched filter with respect to the plurality of long codes for each phase of the pilot signal, determines that the correlation is obtained, and specifies the long code having obtained the correlation as the long code for use in communication, so that the long code for use in communication can be determined in a short time.

DESCRIPTION OF REFERENCE NUMERALS

1 ... radio unit, 2 ... A/D converter, 3, 3' ... spreading code generator, 4, 4', 4" ... matched filter, 5 ... profiler unit, 6 ... correlator, 7 ... RAKE synthesizing unit, 8 ... decoder, 9 ... voice CODEC, 10, 10', 10" ... control unit, 11 ... memory, 12 ... product sum operation circuit, 20 ... profile means, 21 ... switch, 22 ... data memory, 31 ... change-over switch, 32 ... inner product unit, 33 ... RAKE synthesizing unit, 40 ... correlation operator, 41, 41" ... sample hold circuit, 42 ... multiplier, 43 ... adder, 46 ... switch, 47 ... register, 48 ... spreading code shifter, 51 ... data holding unit, 52 ... code holding unit, 53 ... multiplier, 54 ... adder, 61 ... adder, 62 ... power operator

DESCRIPTION OF THE PREFERRED EMBODIMENT

An embodiment of the present invention will be described with reference to the drawings.

In a synchronous circuit according to the embodiment of the present invention, when correlating operation of a received signal and a spreading code is performed to specify the spreading code for use in communication, specific repeatedly received signals are stored beforehand in a memory or the like, and the correlating operation is performed with various spreading codes, which produces an effect that the spreading code can be specified in a short time.

Figure 1:
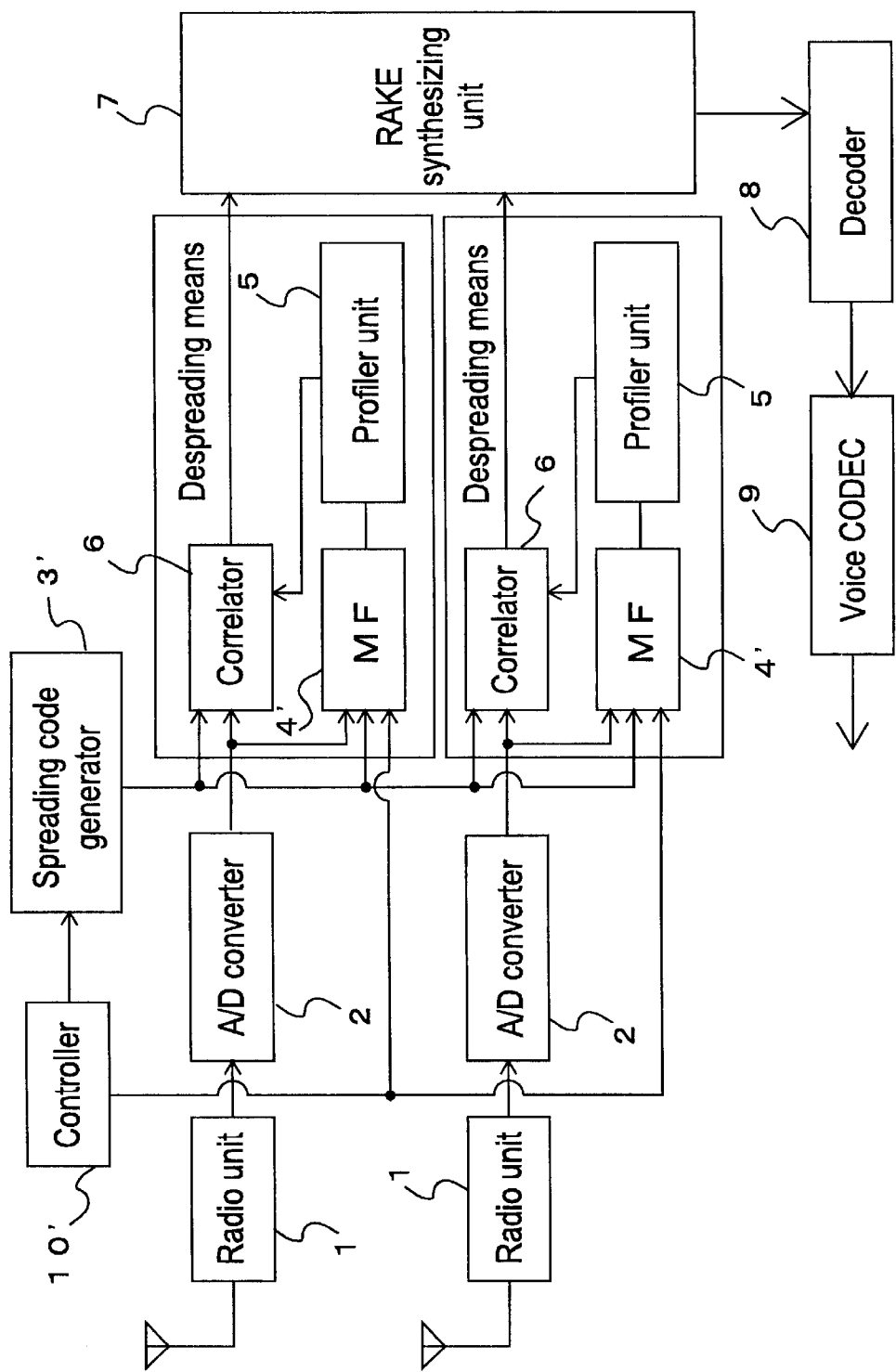
FIG. 1 is a constitution block diagram of a synchronous circuit according to an embodiment of the present invention.

The synchronous circuit according to the embodiment of the present invention will be described with reference to FIG. 1. FIG. 1 is a constitution block diagram of a synchronous circuit according to the embodiment of the present invention.

The synchronous circuit according to the embodiment of the present invention (the present synchronous circuit) is mainly constituted of a radio unit 1 for converting a signal coming in an antenna to a base band signal; an A/D converter 2 for converting the signal inputted from the radio unit 1 to a digital signal; a spreading code generator 3' for generating a designated spreading code; a matched filter 4' for despreading the signal successively inputted from the A/D converter 2 with the spreading code inputted from the spreading code generator 3' and outputting a correlation signal; a profiler unit 5 for outputting a signal indicative of a signal incoming timing (path position timing) based on the correlation signal outputted from the matched filter 4' ; a plurality of correlators 6 for despreading the signal inputted from the A/D converter 2 with the spreading code inputted from the spreading code generator 3' over one symbol time from a plurality of path position timings inputted from the profiler unit 5, and outputting the correlation signals; a RAKE synthesizing unit 7 for RAKE-synthesizing the correlation signals outputted from the correlators 6; a decoder 8 for reproducing the original signal from the RAKE-synthesized signal; a voice CODEC 9 for converting the reproduced signal to a voice signal; and a controller 10' for controlling each unit.

Each component will concretely be described hereinafter, but the radio unit 1, A/D converter 2, profiler unit 5, correlators 6, RAKE synthesizing unit 7, decoder 8, and voice CODEC 9 are the same as those in the conventional circuit.

The spreading code generator 3' generates and outputs the set spreading code from the control unit 10' described later.

Figure 2:
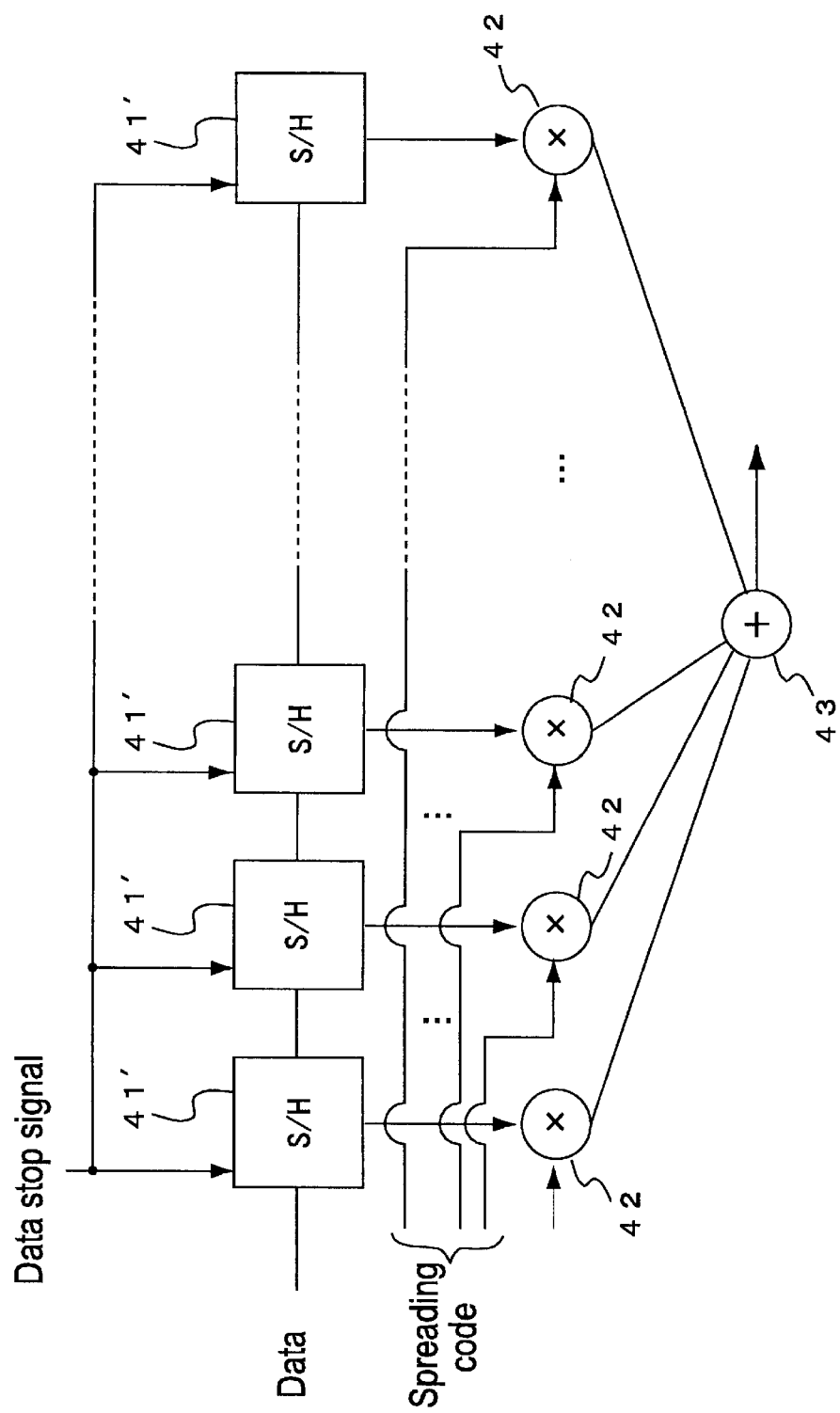
FIG. 2 is a constitution block diagram of a matched filter in the present circuit.

As shown in FIG. 2, the matched filter 4' of the present circuit is basically constituted of a plurality of sample hold circuits 41' , multipliers 42 disposed for the sample hold circuits 41' , and one adder 43. FIG. 2 is a constitution block diagram of the matched filter in the present circuit.

The matched filter 4' is similar to the conventional matched filter 4 described above, but is different in that the already held data continues to be held without taking new data into the sample hold circuit 41 while an input of control signal (hereinafter referred to as the data stop signal) is received from the control unit 10' described later.

Each component of the matched filter 4' shown in FIG. 2 will concretely be described, but the multipliers 42 and the adder 43 are similar to the conventional ones.

The number of the sample hold circuits 41 corresponds to the number of chips used for diffusing one symbol×the number of over-samplings, and the sample hold circuits are connected to multiple stages.

Among these circuits, the first-stage sample hold circuit 41' holds a CDMA modulated signal inputted from the outside for time of one chip time/the number of over-samplings, and outputs the signal to the next sample hold circuit 41' while no input of data stop signal described later is received. While the input of the data stop signal is received, the presently held signal continues to be held as it is.

Moreover, the subsequent sample hold circuit 41' similarly holds the signal inputted from the previous sample hold circuit 41' for the time of one chip time/the number of over-samplings, and outputs the signal to the next sample hold circuit 41' while no data stop signal is inputted. While the input of the data stop signal is received, the presently held signal continues to be held as it is.

Additionally, as not shown, the matched filter 4' may be provided with a register for temporarily storing the spreading code inputted from the spreading code generator 3'.

The control unit 10' operates in the same manner as the conventional unit in a first phase in which a first long code mask symbol is detected, but its operations in a second phase of specifying a group short code and a third phase of specifying a long code for use in communication are different from those of the conventional unit.

Specifically, in the second phase of specifying the group short code, the control unit 10' outputs the data stop signal to the matched filter 4' at a timing of completing the reception of a second long code mask symbol whose synchronization is established in the first phase and which is received with the same phase as that of the first long code mask symbol. Specifically, the matched filter 4' receives the input of data stop signal from the control unit 10' at a timing when the second long code mask symbol is taken.

Moreover, the control unit 10' outputs the spreading code of each group short code to the spreading code generator 3'.

Furthermore, as not shown, the control unit 10' receives the input of correlation signal outputted by the matched filter 4' to detect correlation, and the matched filter 4' detects the correlation from the correlation signal to be outputted with respect to each spreading code of the group short code inputted from the spreading code generator 3', specifies the group short code, and stops the output of the data stop signal.

Additionally, in the third phase of specifying the long code for use in communication, the control unit 10' outputs the data stop signal to the matched filter 4' at a timing of completing the reception of a symbol (pilot symbol) diffused with the long code, whose synchronization is established in the first phase and which is received immediately after the first long code mask symbol. Therefore, the matched filter 4' continues to hold a pilot signal.

Subsequently, the control unit 10' successively outputs the long code to the spreading code generator 3' by changing the phase.

The operation of the present synchronous circuit will next be described.

For the present synchronous circuit, in the first phase in which the first long code mask symbol is correlated/detected, and synchronization is obtained with a time slot, first the control unit 10' sets the spreading code of the first long code mask symbol to the spreading code generator 3', and the spreading code generator 3' outputs the spreading code.

Subsequently, the radio unit 1 receives a first perch channel from the signal coming in the antenna, and the matched filter 4' reverse-diffuses the digital signal converted by the A/D converter 2 to output a correlation output.

Then, the control unit 10' checks the correlation output of the matched filter 4', correlates/detects the first long code mask symbol, and achieves the synchronization to the time slot.

Since the signal format of the first perch channel has a length of ten symbols, ten symbols (one slot time) are required until the correlation detection is performed to attain the synchronization. The processing up to this stage is the same as that in the conventional synchronous circuit.

Subsequently, in the second phase, the radio unit 1 receives a second perch channel from the signals coming in the antenna, and the A/D converter 2 converts the second perch channel signal to the digital signal.

Then, the control unit 10' starts the output of the data stop signal to the matched filter 4' at a timing when the reception of the second long code mask symbol received with the same phase as that of the first long code mask symbol is completed, and further sets 16 types of group short codes to the spreading code generator 3', and the spreading code generator 3' successively outputs the 16 types of group short codes.

In this manner, the second long code mask symbol remains to be held in the sample hold circuit 41' of the matched filter 4', and the matched filter 4' successively outputs the correlation signal of the second long code mask symbol and the spreading code of the 16 types of group short codes which are successively inputted from the spreading code generator 3'.

Here, the spreading code generator 3' does not have to necessarily output the spreading code for each chip timing, and may rather output the code for each timing when the matched filter 4' completes its product sum operation, so that the matched filter 4' can successively perform its correlating operation, and the correlation output for each group short code can be obtained in a short time.

Subsequently, the control unit 10' receives the input of correlation signal to each group short code from the matched filter 4', detects the signal with which correlation is obtained, specifies the group short code corresponding to the signal, and stops the output of the data stop signal.

As described above, in the second phase, in addition to one slot time required for taking the second long code mask symbol by the matched filter 4', only the time for successively performing the correlating operation in response to the input of 16 types of group short codes is required.

The time for successively performing the correlating operation is within one symbol time at most, when the operation is performed while generating the spreading code. Specifically, since one symbol=0.0625 milliseconds, the group short code can be specified in 0.0625×16 types=one millisecond at most.

Furthermore, in the third phase, the radio unit 1 receives the pilot signal from the signal coming in the antenna, and the A/D converter 2 converts the pilot signal to the digital signal.

Subsequently, the control unit 10' starts the output of the data stop signal to the matched filter 4' at a timing when the reception of the pilot symbol received from the phase immediately after the first long code mask symbol is completed, and successively sets 32 types of spreading codes belonging to the group indicated by the group short code specified in the second phase to the spreading code generator 3' by changing the phase.

Then, the spreading code generator 3', changes the phase while generating and successively outputting the 32 types of spreading codes, and in this case, the pilot symbol remains to be stored, and held in the sample hold circuit 41' of the matched filter 4'.

Subsequently, the correlating operation of the pilot signal held by the matched filter 4', and the 32 types of spreading codes successively inputted from the spreading code generator 3' with 16 types of phases being changed is performed for each phase of the spreading code, and the correlation signal is outputted.

Then, the control unit 10' receives the input of the correlation signal, and specifies the long code corresponding to the spreading code having obtained the correlation as the long code for use in communication.

In the third phase, since the correlating operations with 32 types of spreading codes are performed in order while changing 16 types of phases, 32×16=512 operations are performed. However, the operation is performed based on the signal already taken into the matched filter 4' without taking a new signal. Therefore, even when the operation is performed while generating the spreading code, one operation at most can be completed in one symbol time at most. Specifically, since one symbol=0.0625 milliseconds, the operation of the third phase can be completed in 0.0625× 512=32 milliseconds at most, which can effectively shorten the time required for the processing.

Figure 3:
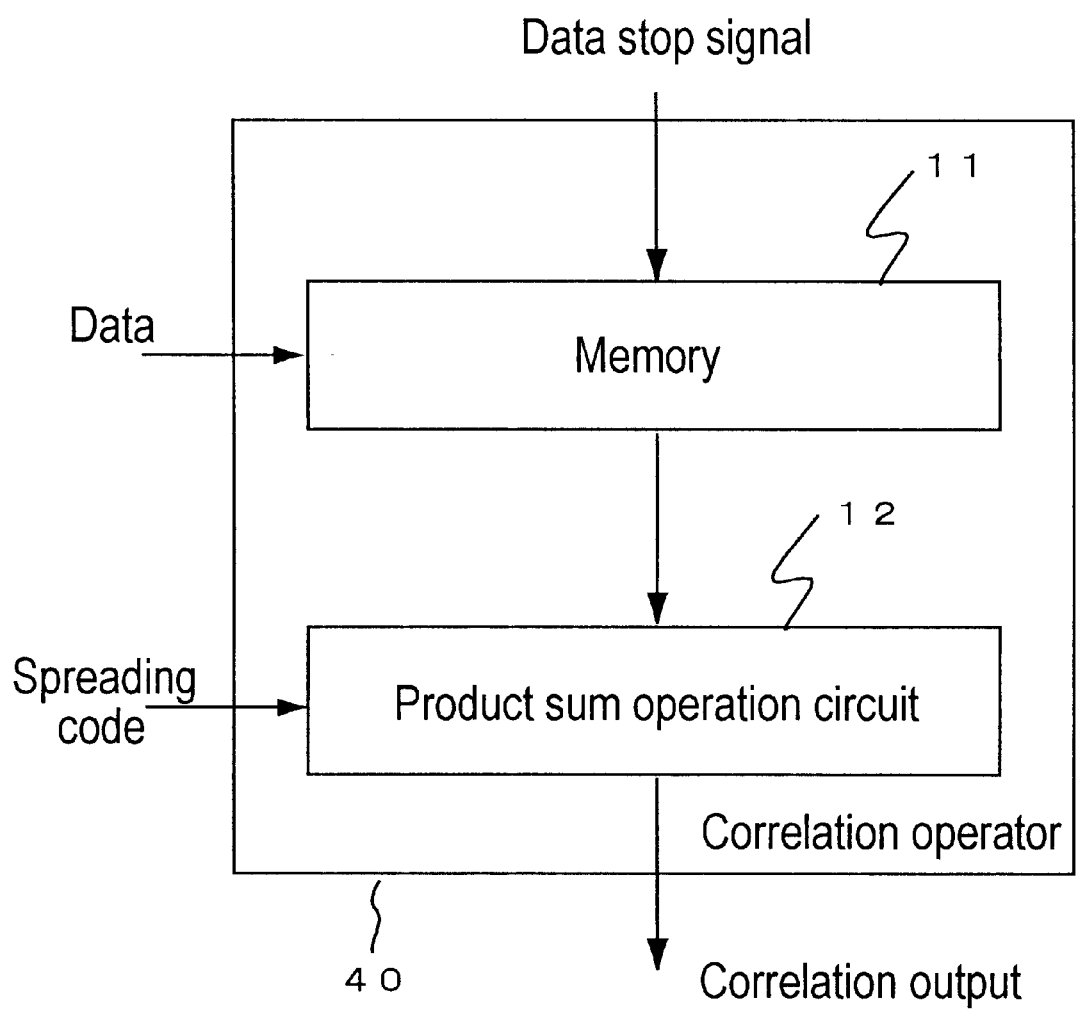
FIG. 3 is a constitution block diagram of a correlation operator 40.

Moreover, here, the matched filter 4' is used for performing the correlating operation, but as shown in FIG. 3, even in a circuit (hereinafter referred to as the correlation operator 40) in which a memory 11 is substituted for the sample hold circuit 41' and a product sum operation circuit 12 is substituted for the multipliers 42 and adder 43, the correlating operation can be performed. FIG. 3 is a constitution block diagram of the correlation operator 40.

Specifically, the memory 11 of the correlation operator 40, instead of the sample hold circuit 41', is provided with a capacity to hold signals with the number of chips corresponding to the number of chips per symbol×the number of over-samplings and holds one symbol of signals inputted from the A/D converter 2 until the input of data stop signal is received from the control unit 10'.

Moreover, upon receiving the input of the data stop signal, the memory 11 allows the signal stored in the memory at this time to remain to be held irrespective of the signal inputted from the A/D converter 2.

The product sum operation circuit 12 can concretely be realized by digital operation circuits such as CPU and DSP, to receive the input of spreading code from the spreading code generator 3', perform the product sum operation with the signal stored in the memory 11 and to output the result as the correlation signal to the outside.

Figure 4:
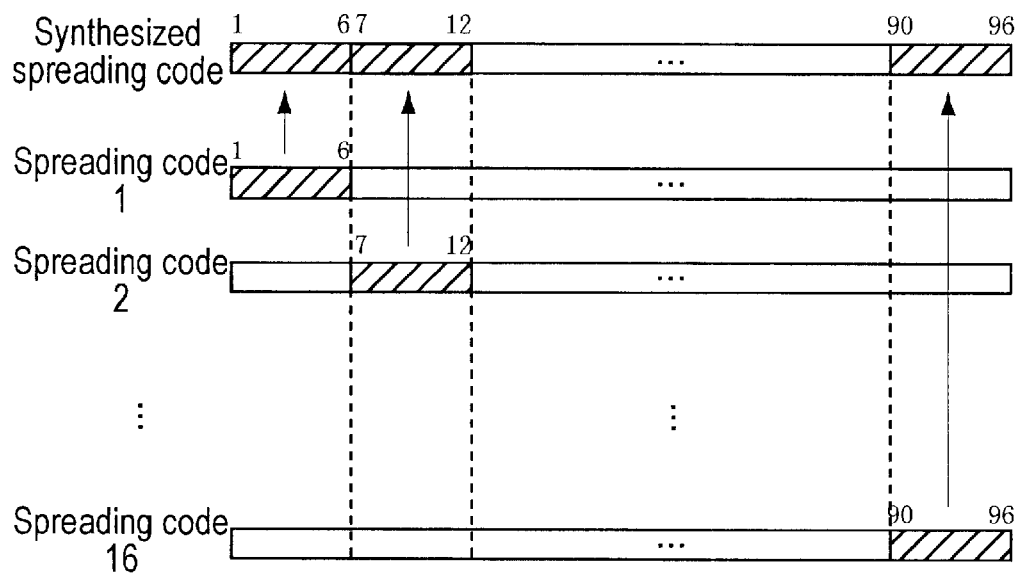
FIG. 4 is an explanatory view showing one example of a spreading code when a partial correlation is calculated.
Figure 4:
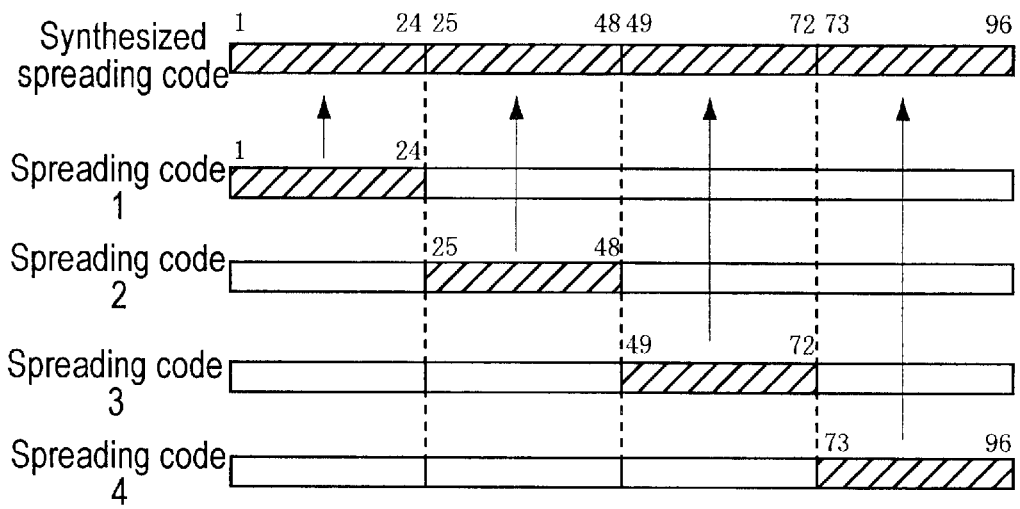

According to the correlation operator 40, more flexible correlating operation can be performed. For example, after the correlation operator 40 is used to take the second long code mask symbol into the sample hold circuit 41' of the matched filter 4' in the second phase, a partial correlation with each of the 16 types of group short codes is calculated, so that less product sum operations may be performed. This method will be described hereinafter with reference to FIG. 4. FIG. 4 is an explanatory view showing one example of the spreading code when the partial correlation is calculated.

The partial correlation herein means that the correlation of a part of the signal stored in the memory 11 of the correlation operator 40 and a part of the spreading code is calculated.

First, the control unit 10' divides 16 types of group short codes, for example, into 16 phase portions.

Specifically, the first group short code is divided to a first portion from the spreading code corresponding to the first chip to the spreading code corresponding to the sixth chip, to a second portion from the spreading code corresponding to the seventh chip to the spreading code corresponding to the 11-th chip, similarly to a 16-th portion from the spreading code corresponding to the 90-th chip to the spreading code corresponding to the 96-th chip.

Subsequently, the control unit 10' allots each portion divided and obtained from the group short code to the original phase portion for synthesis to generate the spreading code having the original length.

Specifically, as shown in FIG. 4(a), the control unit 10' synthesizes the spreading code corresponding to the first chip to the spreading code corresponding to the sixth chip to form the spreading code corresponding to the first chip to the spreading code corresponding to the sixth chip of the first group short code, the spreading codes corresponding to the seventh chip to the 11-th chip to form the corresponding portion of the second group short code, and the like.

Subsequently, the control unit 10' sets the spreading code synthesized as described above to the spreading code generator 3', and the spreading code generator 3' outputs the synthesized spreading code.

Then, the correlation operator 40 calculates the correlation of the synthesized spreading code and the second long code mask symbol stored in the memory 11 for each portion (the first chip to the sixth chip, and the seventh chip to the 11-th chip in the above example) to calculate the partial correlation of each portion, and outputs the partial correlation.

Subsequently, the control unit 10' detects a peak from 16 partial correlations obtained from the correlation operator 40, and specifies the group short code.

In this case, since the frequency of the operations can be reduced to 1/16 of the original frequency, the power consumption can effectively be reduced.

However, since the correlating operation is partially performed, the correlation value of each portion becomes small as compared with when the operation is entirely performed. Therefore, it can be considered that the peak cannot easily be detected.

In this case, as shown in FIG. 4(b), the candidates for the spreading codes are divided, for example, into four sets, the spreading code of each set is divided into four portions, and four portions are synthesized to constitute four spreading codes for performing the partial correlating operation. Then, the frequency of the operations is reduced to 1/4 of 16 times, and the peak can effectively be detected.

Moreover, in the third phase, for example, by allowing the top portion of each of 32 types of long codes belonging to the group indicated by the specified group short code to synthesize and set one spreading code to the spreading code generator 3', the partial correlation can similarly be obtained.

As described above, according to the present synchronous circuit, the operations of the second and third phases can be completed within one millisecond and 32 milliseconds at most, respectively, and the first phase to the third phase are completed in 33 milliseconds. Even when the long code with eight base stations in the vicinity is specified, only 264 milliseconds are required, so that the time until the long code for use in communication is specified can remarkably be reduced.

Furthermore, according to the present synchronous circuit for performing the partial correlating operation, there are effects that the frequency of the product sum operations is reduced to reduce the power consumption and that the time until specifying the long code can further be reduced to quickly complete the preparation for communication start.

A receiver according to the embodiment of the present invention will next be described.

The receiver according to the embodiment of the present invention is provided with a data memory to store data outputted from the A/D converter 2 for each detected path timing as the delay profile, and to successively perform the product sum operation of each stored data and the long code or the short code, for example, with a matched filter, a sliding correlator, or an inner product unit in a time division manner, so that the circuit scale is reduced, and the power consumption can be curtailed.

Here, one inner product unit or the like may be disposed, but when there are much data to be processed, a plurality of units may be disposed.

Moreover, the data herein includes the long code mask symbol, pilot symbol, and data symbol (symbol received via the first perch channel, data channel, or control channel).

Additionally, an example in which the inner-product unit is used as means for performing the despreading by the product sum operation will be described hereinafter.

Figure 5:
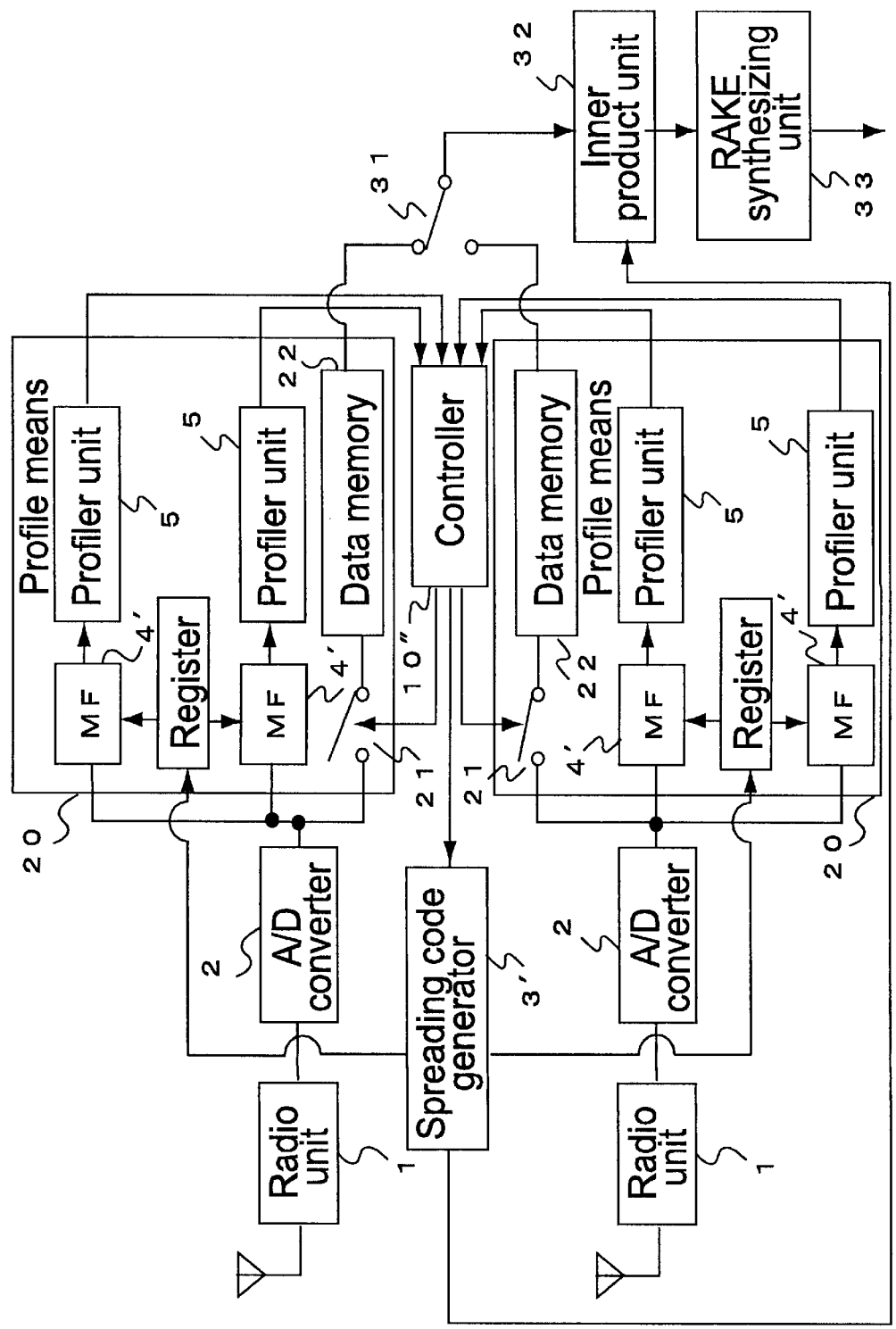
FIG. 5 is a constitution block diagram of a receiver according to the embodiment of the present invention.

The receiver according to the embodiment of the present invention (the present receiver) is, as shown in FIG. 5, basically constituted of a radio unit 1 for receiving the signal coming in the antenna, and outputting a base band signal; an A/D converter 2 for converting the base band signal outputted from the radio unit 1 to a digital signal; a spreading code generator 3' for generating a spreading code; profile generating means 20 for despreading the received signal in accordance with the spreading code outputted by the spreading code generator 3' to generate the delay profile; a change-over switch 31 for selecting one despreading means in accordance with an instruction inputted from a control unit 10" described later to output the signal outputted by the selected profile generating means 20; an inner product unit 32 for performing product sum operation of the signal inputted via the change-over switch 31 and the spreading code inputted from the spreading code generator 3' to emit an output; a RAKE synthesizing unit 33 for RAKE-synthesizing the signal inputted from the inner product unit 32; and the control unit 10" for controlling each component. FIG. 5 is a constitution block diagram of the receiver according to the embodiment of the present invention.

Additionally, FIG. 5 shows two systems (branches) of the radio units 1, A/D converters 2, and profile generating means 20 to demodulate and RAKE-synthesize the signals coming in the antennas.

Moreover, the profile generating means 20 reverse-diffuses the digital signal inputted from the A/D converter 2 with the spreading code inputted from the spreading code generator 3', and is constituted of two matched filters (MF) 4; a profiler unit 5 disposed for each matched filter 4 for storing a correlation output inputted from the corresponding matched filter 4' over one symbol time to detect a path position, and outputting a signal indicating a plurality of path position timings to the control unit 10"; a switch 21 controlled by the control unit 10" to turn on/off; and a data memory 22 for storing the digital signal outputted by the A/D converter 2 when the switch 21 is turned on.

Here, the reason why two matched filters 4' are shown is that when hand-over is performed moving between cells, individual physical channel data ate demodulated, and additionally the synchronization with the signal of the base station as the addressee of the hand-over needs to be established.

Additionally, when one matched filter 4' is used in a time division manner, one matched filter 4' may be disposed.

Figure 6:
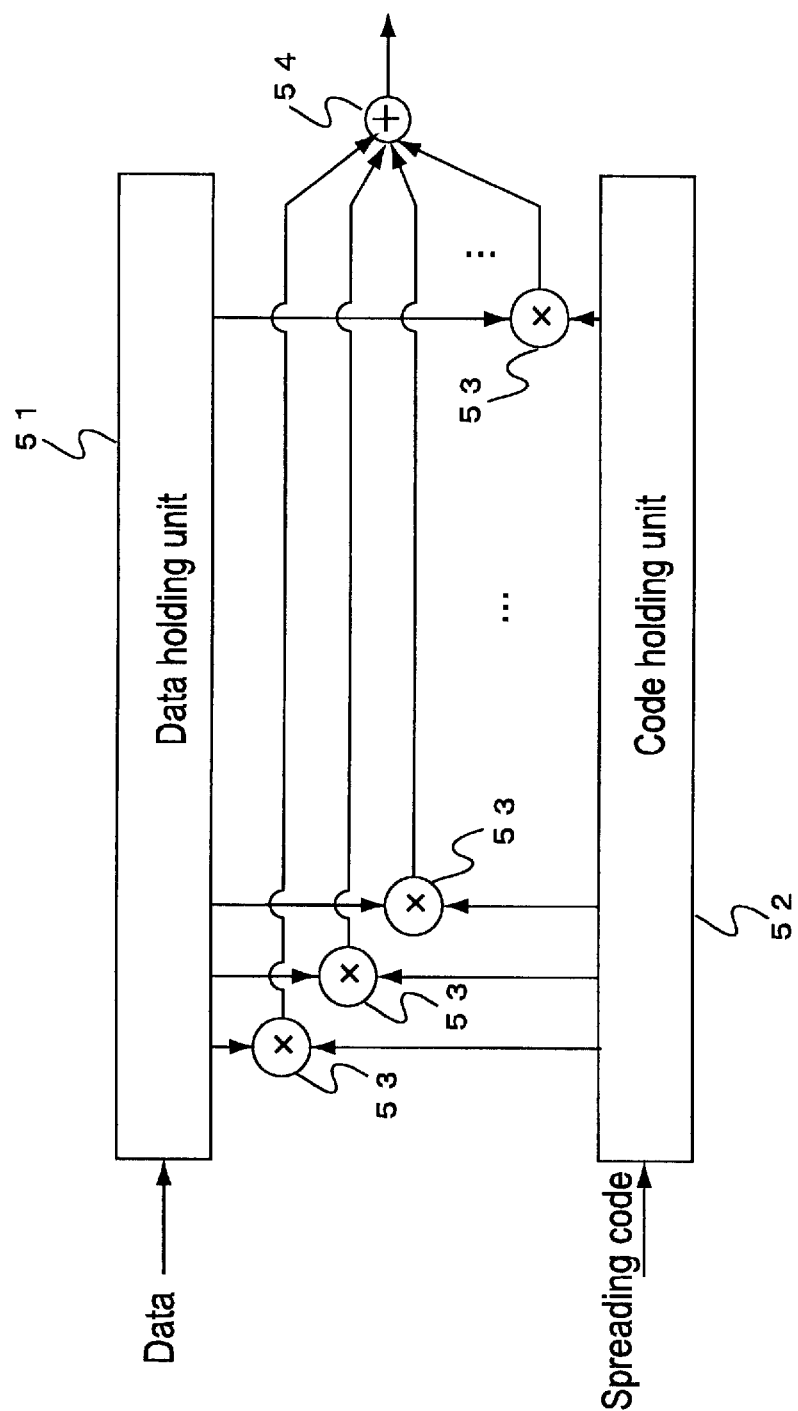
FIG. 6 is a constitution block diagram of an inner product unit 32.

Furthermore, as shown in FIG. 6, the inner product unit 32 is constituted of a data holding unit 51 for holding the data, a code holding unit 52 for holding the long code as the spreading code, a plurality of multipliers 53 disposed corresponding to the number of chips of the long code×the number of over-samplings, and an adder 54. FIG. 6 is a constitution block diagram of the inner product unit 32.

Each component will concretely be described hereinafter, but the radio unit 1, A/D converter 2, spreading code generator 3', matched filter 4', and profiler unit 5 are similar to those of the synchronous circuit according to the above-described first embodiment of the present invention.

When the long code for use in communication can be specified, the control unit 10" sets the long code to the spreading code generator 3', and allows the spreading code generator 3' to generate the long code for use in communication.

Moreover, upon receiving the input of the signal indicating the path position timing from the profiler unit 5 of the profile generating means 20, the control unit 10" turns on the switch 21 of the profile generating means 20 at this timing.

Furthermore, the control unit 10" changes the change-over switch 31 in a time division manner, alternately selects two profile generating means 20 (corresponding to each branch), and connects the selected means to the inner product unit 32.

When the change-over switch 31 is changed, the inner product unit 32 stores the data stored by the data memory 22 of the connected profile generating means 20 into the data holding unit 51.

Moreover, the inner product unit 32 stores the long code as the spreading code outputted by the spreading code generator 3' into the code holding unit 52.

Furthermore, the inner product unit 32 performs the product sum operation of the data stored in the data holding unit 51 and the code stored in the code holding unit 52 with the same phase, and outputs the correlation output to the outside.

Figure 7:
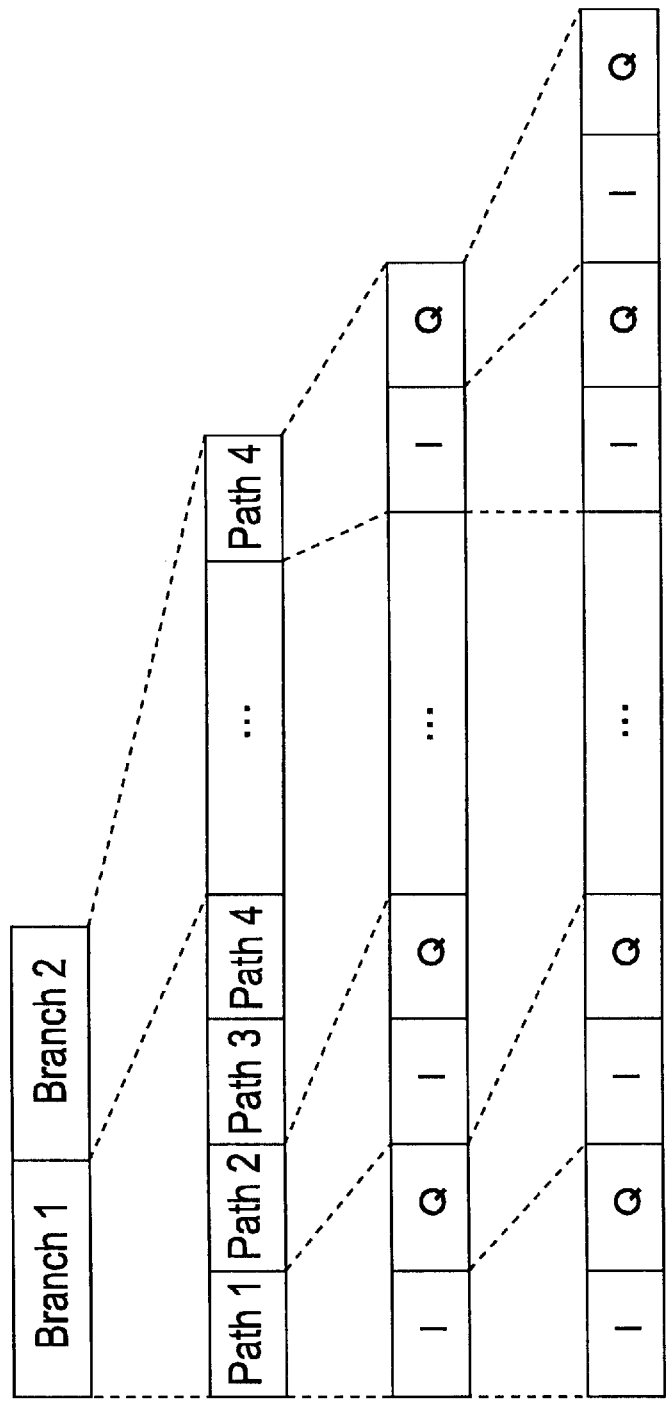
FIG. 7 is a timing chart showing a processing timing of the inner product unit 32.

The operation of the present receiver will next be described with reference to FIG. 7. FIG. 7 is a timing chart showing the processing timing of the inner product unit 32.

Additionally, FIG. 7 shows the product sum operation of each of received data I/Q and spreading code I/Q for two branches and four paths.

First, the control unit 10" changes the change-over switch 31 to the profile generating means 20 corresponding to the first branch.

Subsequently, the control unit 10" receives the input of the signal indicating the first path position timing inputted from the profiler unit 5 of the profile generating means 20, turns on the switch 21 at this timing, and stores the signal outputted by the A/D converter 2 to the data memory 22.

Then, the data holding unit 51 of the inner product unit 32 reads and holds I phase component of the signal stored in the data memory 22, and the code holding unit 52 of the inner product unit 32 reads and holds I phase signal of the long code outputted by the spreading code generator 3'.

Subsequently, the inner product unit 32 performs the product sum operation of the signal and content held by the data holding unit 51 and the long code held by the code holding unit 52, and transmits an output to the RAKE synthesizing unit 7.

Here, since the time required for one product sum operation is the total of the time for reading the data from the data memory 22 by the data holding unit 51 and the time for performing the operation processing, only a short time is necessary.

Furthermore, the inner product unit 32 reads and holds Q phase signal of the long code inputted from the spreading code generator 3' into the code holding unit 52, performs the product sum operation of the I phase component of the signal held in the data holding unit 51 and the Q-phase signal of the long code held in the code holding unit 52, and transmits an output to the RAKE synthesizing unit 7.

Subsequently, the data holding unit 51 of the inner product unit 32 reads and holds the Q phase component of the signal stored in the data memory 22, performs the product sum operation of the I phase and Q phase component signals of the long code outputted by the spreading code generator 3' in the same manner as in the I phase component, and transmits an output to the RAKE synthesizing unit 7.

On the other hand, upon receiving the input of the signal indicating a second path position timing inputted from the profiler unit 5 of the profile generating means 20, the control unit 10" turns on the switch 21 at this timing, and stores the signal outputted by the A/D converter 2 into the data memory 22.

Subsequently, the inner product unit 32 performs the product sum operation of the I phase and Q phase component signals of the long code inputted from the spreading code generator 3' with respect to the I phase and Q phase components of the signal starting from the second path position, and outputs a demodulation result.

Thereafter, the third and fourth path positions are similarly subjected to the product sum operation to output a demodulation result.

Subsequently, the control unit 10" changes the change-over switch 31 to the profile generating means 20 corresponding to a second branch to perform the similar processing on the first to fourth path positions.

As described above, 64 product sum operations are performed for the two branches and four paths. When in each product sum operation, one clock has the same rate as that of the spreading code or a short period of ½ or ¼ of the rate, only the time of data reading time+about one clock of time is necessary, so that all the product sum operations can be achieved within one symbol time.

In this manner, according to the first receiver according to the embodiment of the present invention, the signal from each path position is stored in the data memory 22. Moreover, since the inner product unit 32 reads the data from the data memory 22 and performs the product sum operation with the long code separately read from the spreading code generator 3' for each branch path with respect to each of the I and Q phase components, all the product sum operations can be achieved even if each product sum operation is performed in the inner product unit 32 in the time division manner. Therefore, one inner product unit 32 may be disposed, so that the circuit scale is reduced, and the power consumption can effectively be reduced.

Additionally, to further reduce the power consumption, a low speed is preferable to a degree to which the time required for the product sum operation fails to exceed one symbol time.

Moreover, the order for performing the product sum operation has been described with reference to FIG. 7, but there is no particular restriction, and any order may be used.

Figure 8:
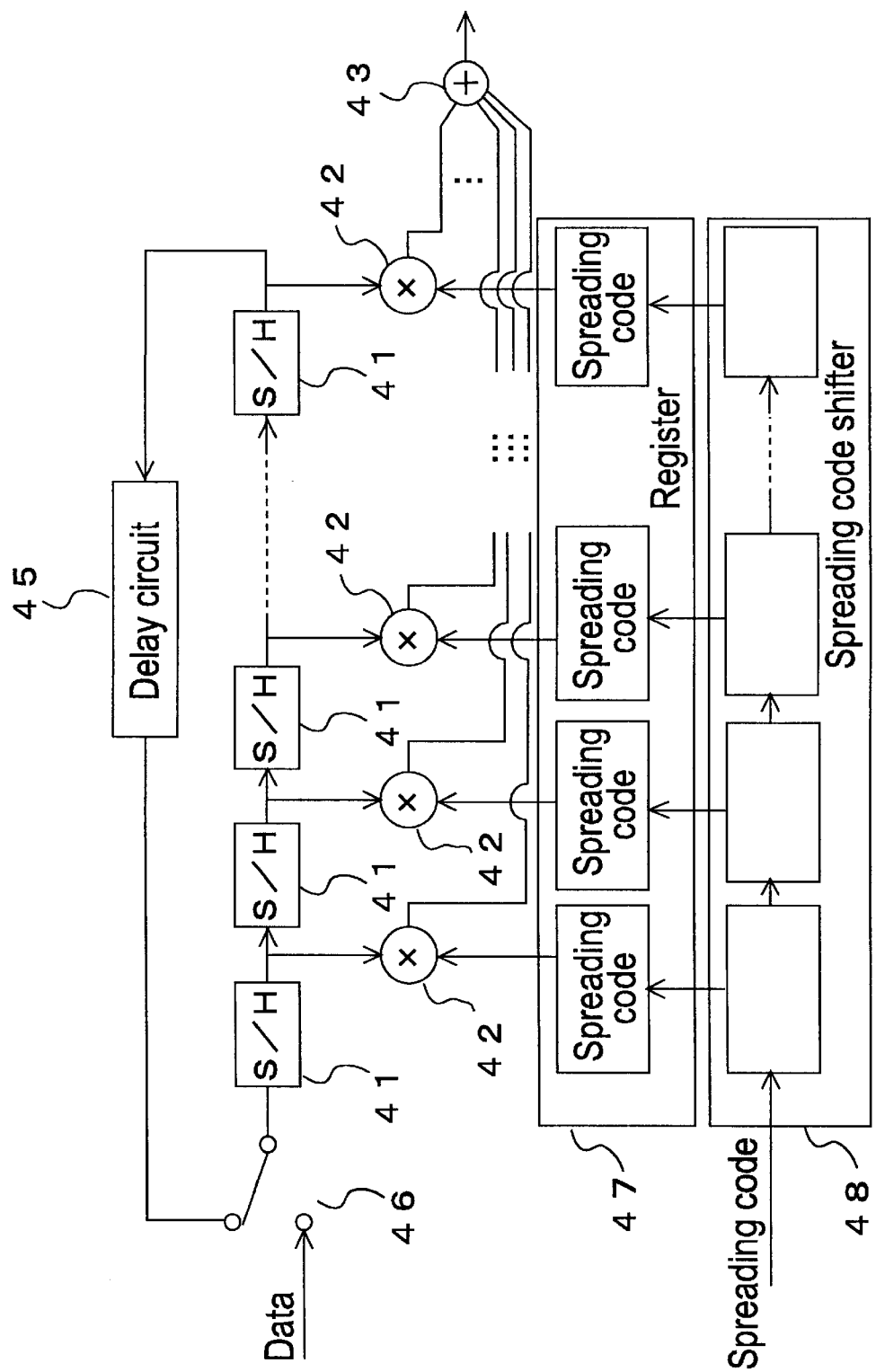
FIG. 8 is a constitution block diagram showing another example of the matched filter in the present synchronous circuit and receiver.

Moreover, the matched filter in the present synchronous circuit and the present receiver may be as follows:

Specifically, another matched filter 4" in the present synchronous circuit and the present receiver is, as shown in FIG. 8, basically constituted of sample hold circuits 41 disposed corresponding to the number of chips per symbol× the number of over-samplings for holding each inputted signal only for one sample clock time and shifting to the next stage at the next timing, multipliers 42, an adder 43, a delay circuit 45 for delaying and outputting the signal outputted by the final-stage sample holding circuit 41, a switch 46 for selecting either one of the signal outputted by the delay circuit 45 and the signal outputted by the A/D converter 2 and selectively outputting the signal to the first-stage sample hold circuit 41, a register 47 for holding a spreading code, and a spreading code shifter 48 for successively shifting the spreading code stored in the register 47 in one chip unit. FIG. 8 is a constitution block diagram showing one example of another matched filter in the present synchronous circuit and the present receiver.

For the operation of the matched filter 4", the operation in the third phase when the filter is applied to the synchronous circuit will be described hereinafter.

To hold the pilot symbol, the switch 46 selects the signal outputted by the A/D converter 2 at a slot start timing, and the data of the pilot symbol positioned in the top of the slot are successively inputted and stored in the sample hold circuits 41 connected to multiple stages.

In time, at a timing when the sample hold circuit 41 holds the entire pilot symbol, the control unit 10' starts the output of the data stop signal, and the switch 46 is changed in response to the input of the data stop signal to select the signal outputted by the delay circuit 45. Additionally, in the following description, the side of the switch 46 on which the signal outputted by the delay circuit 45 is selected will be referred to as "the cyclic operation side".

Subsequently, the spreading code generator 3' selectively outputs the candidates for 32 types of spreading codes belonging to the group specified in the second phase in order, and the spreading code shifter 48 successively shifts the spreading code and stores the code into the register 47 corresponding to the chip. Thereby, the register 47 holds the spreading code.

In time, when the register 47 holds the corresponding spreading code, the multiplier 42 multiplies the data stored in the corresponding sample hold circuit 41 and the corresponding register 47 and the spreading code and outputs a result, and the adder 43 adds the multiplication results outputted by the multipliers 42 and outputs the correlation output to the outside.

Subsequently, the sample hold circuit 41 replaces the held data by each chip unit in a cyclic manner, repeatedly performs the above-described operation, and successively outputs the correlation output to the outside.

For the correlation output, the spreading code is outputted as it is, but the data stored in the sample hold circuit 41 is replaced by each chip unit in a cyclic manner. Therefore, the correlation output with the phase substantially deviating by each chip is obtained.

Here, each chip unit is set by considering over-sampling. For example, when fourfold over-sampling is performed, four cyclic replacements are performed on each chip unit.

On the other hand, while this repeated operation is performed, the spreading code shifter 48 successively shifts in response to the input of the next candidate for the spreading code from the spreading code generator 3' to complete the preparation for storage into the register 47.

Subsequently, when the repeated operations corresponding to the phases are completed, the spreading code held by the spreading code shifter 48 is stored in the register 47, and the sample hold circuit 41 performs the similar cyclic repeated operation.

Additionally, the delay circuit 45 herein considers the time (of several clocks) for storing the spreading code into the register 47 by the spreading code shifter 48, and may make a round of data stored in the sample hold circuit 41 in the time of one symbol time+several clocks.

Furthermore, for 32 types of long codes, the correlation outputs obtained by changing 32 types of long codes with 16 types of phases are all obtained after about 32 symbol time. Therefore, the long code having obtained the correlation and the phase can be detected before about 32 symbol time elapses at latest, so that the processing of the third phase can effectively be performed quickly with a simple constitution.

Moreover, when the long code can be specified as described above, the long code is subsequently set to the register 47, and the switch 46 selects the signal outputted by the A/D converter 2. In this case, by despreading the subsequent signal, the matched filter of the receiver can be operated.

Furthermore, the register is used here, but the spreading code may directly be outputted from the spreading code generator 3'.

Figure 9:
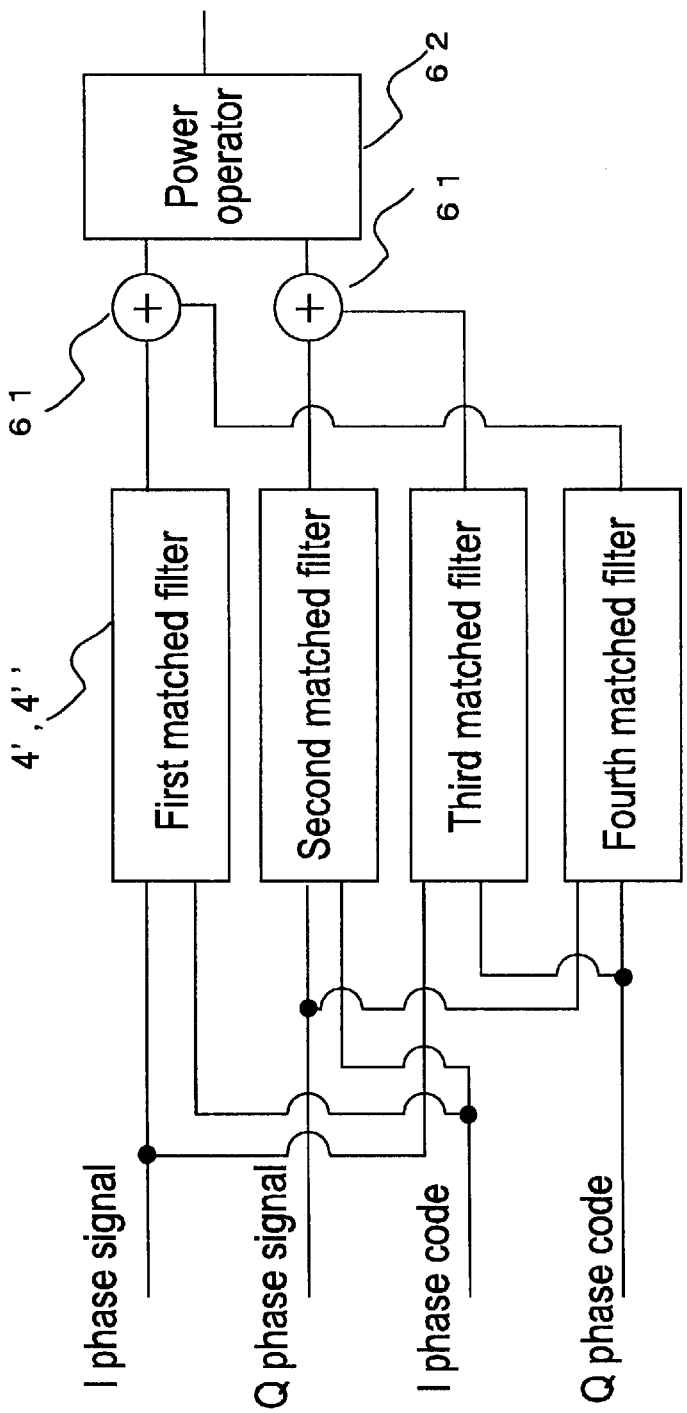
FIG. 9 is a constitution block diagram showing the constitution example of the matched filter for obtaining a correlation output when there are an I phase component signal and a Q phase component signal in the synchronous circuit and receiver of the present invention.
Figure 10:
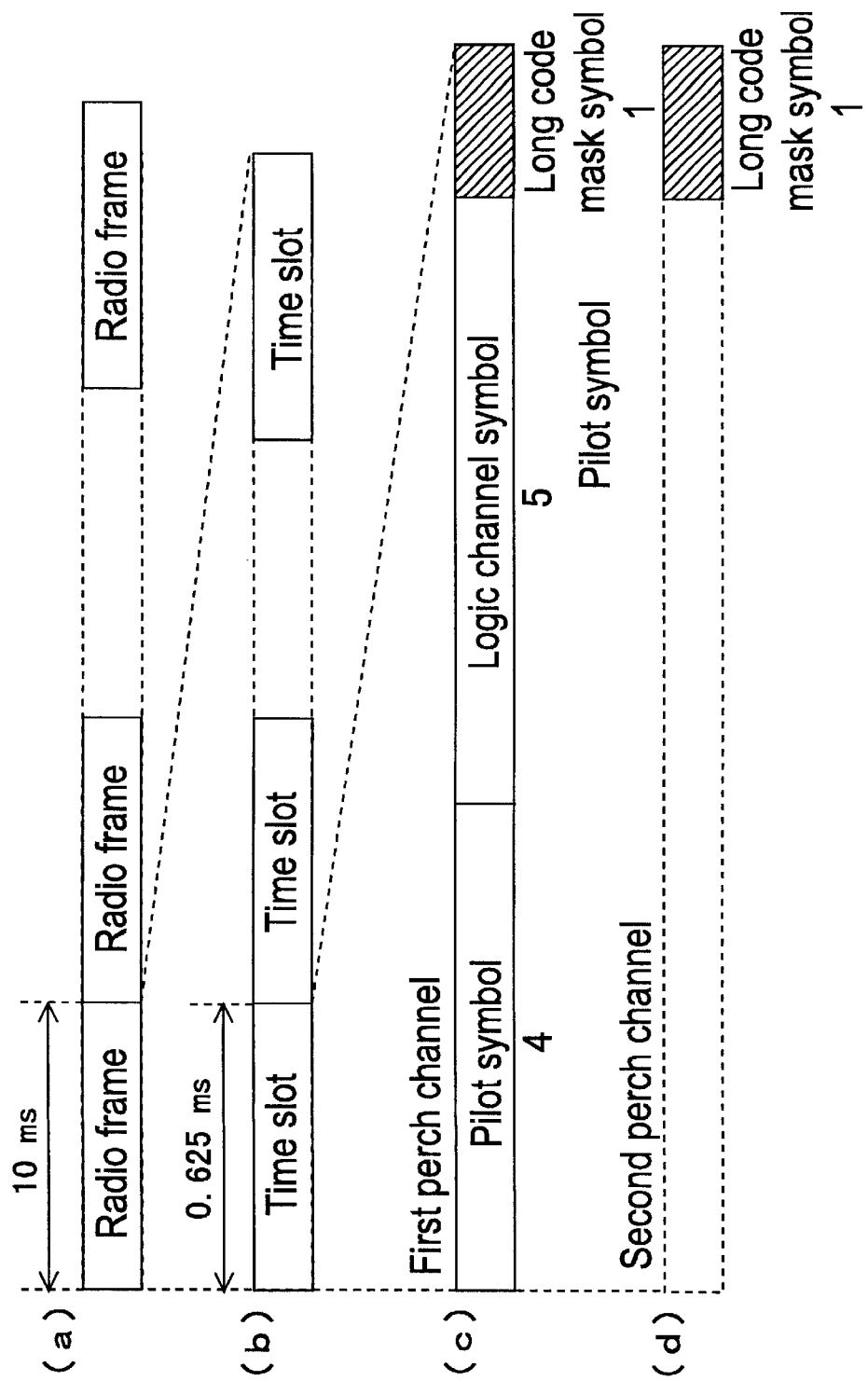
FIG. 10 is an explanatory view showing the signal format of a W-CDMA system.
Figure 11:
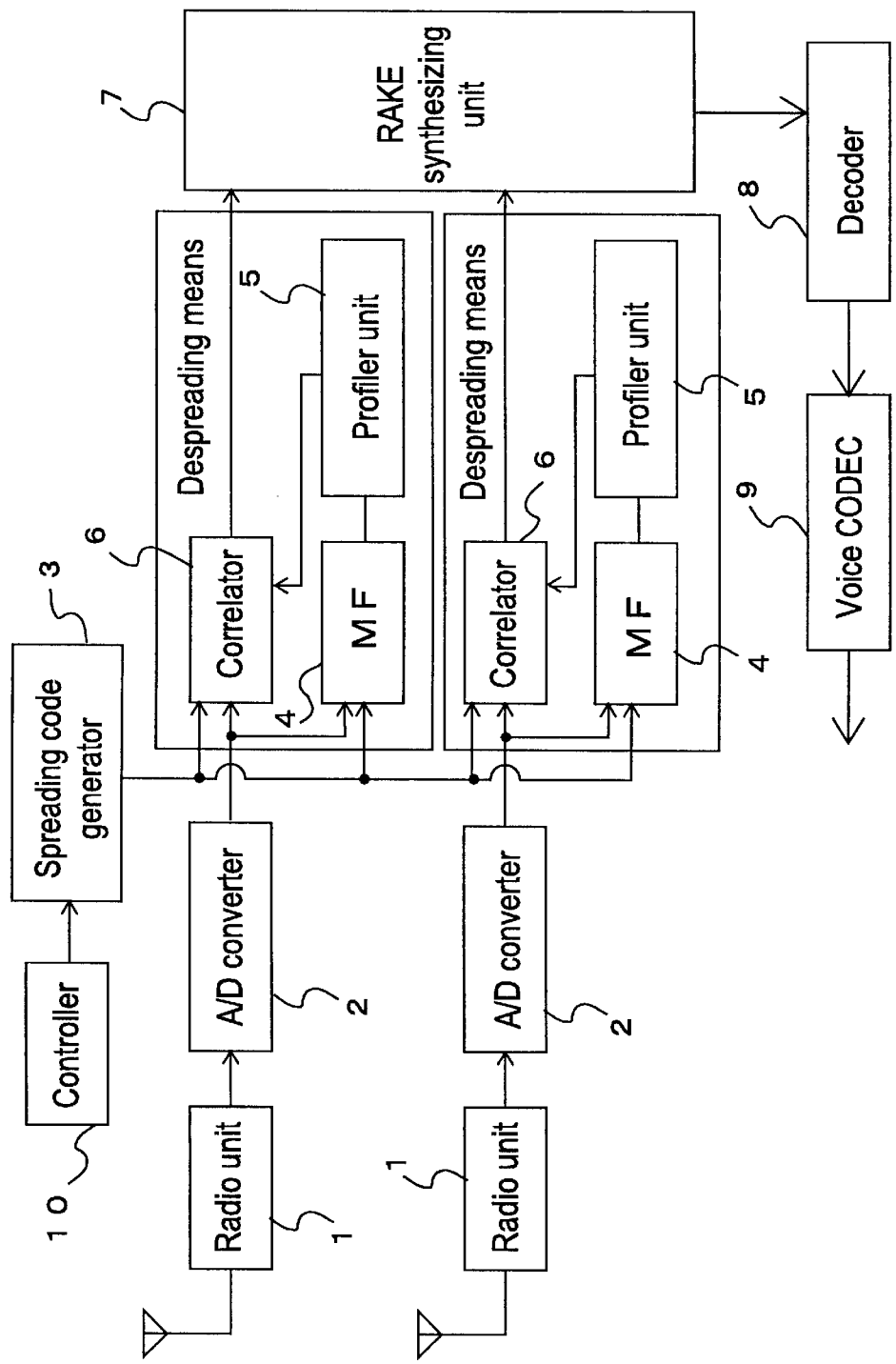
FIG. 11 is a constitution block diagram of a conventional synchronous circuit.
Figure 12:
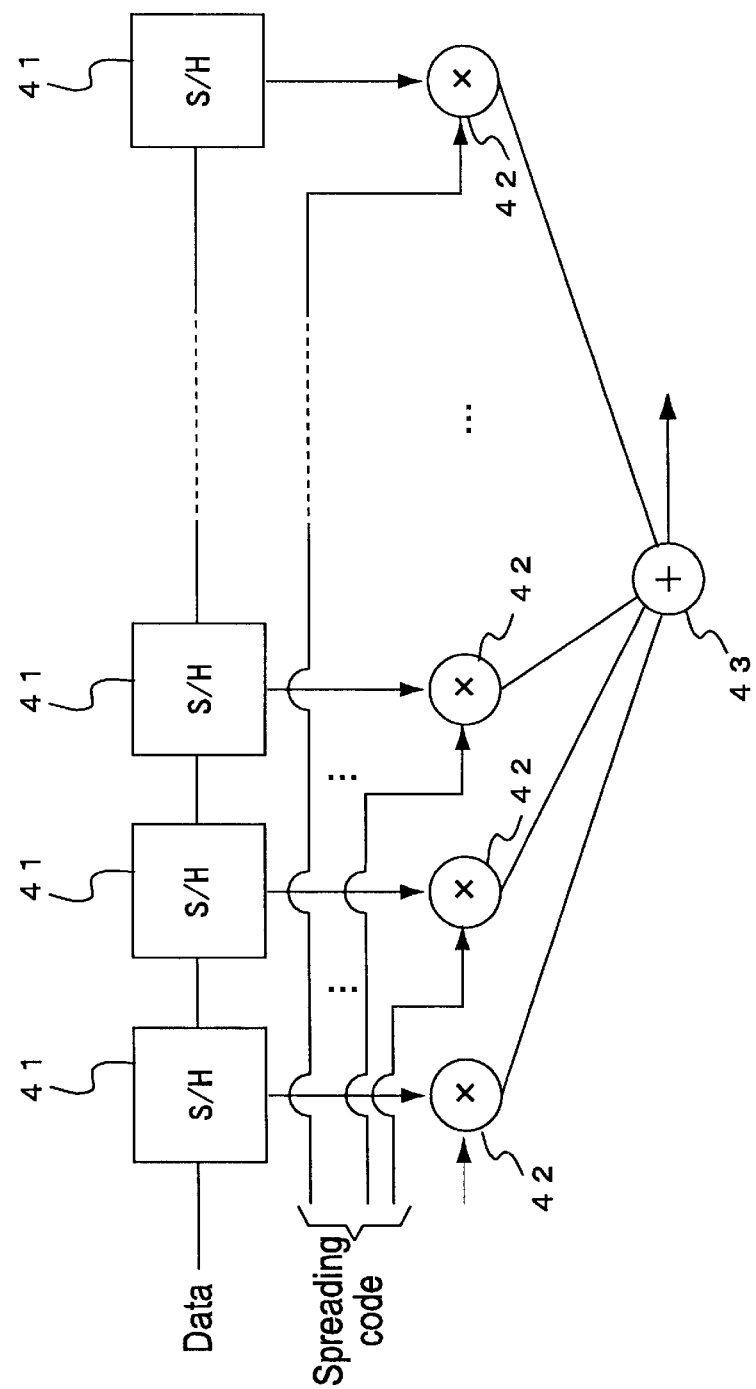
FIG. 12 is a constitution block diagram of a matched filter in the conventional synchronous circuit of a mobile station.
Figure 13:
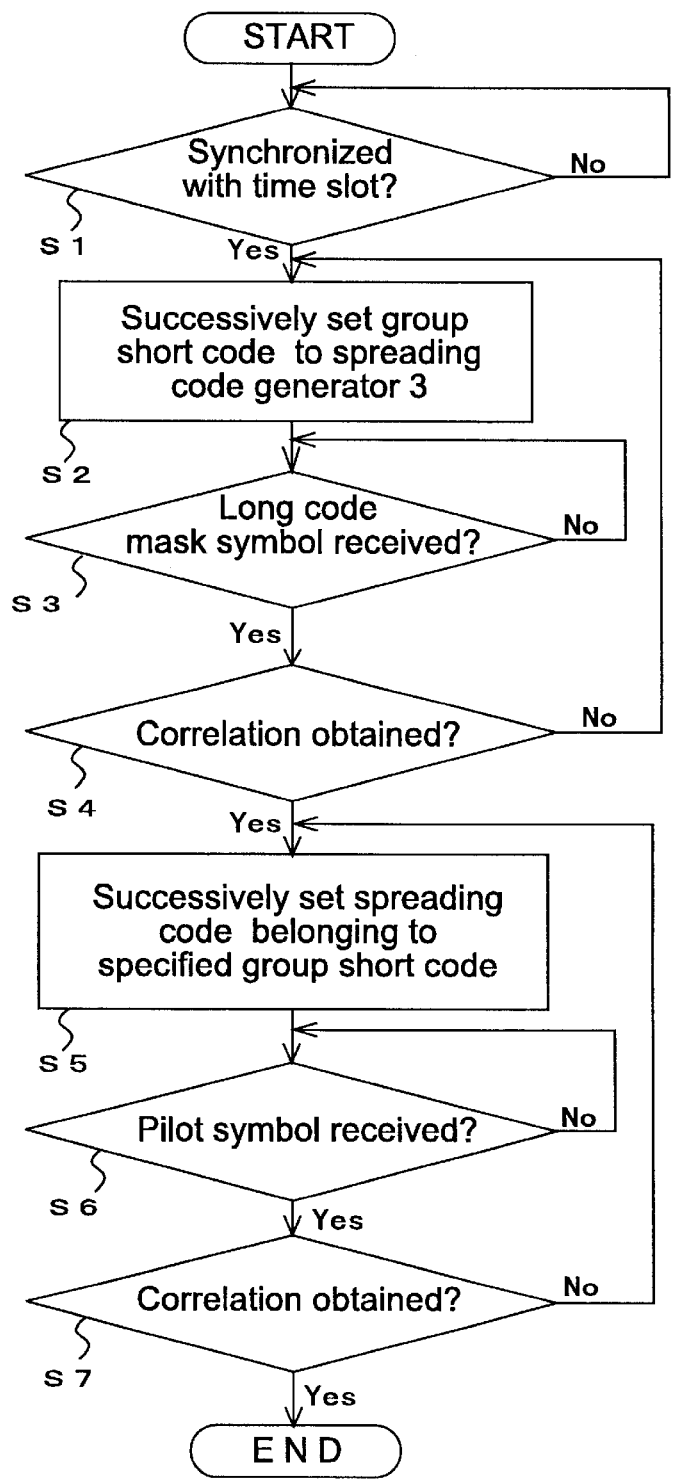
FIG. 13 is a flowchart showing a processing from when a group short code is specified in a control unit 10 until a long code is obtained.

Additionally, in the synchronous circuit and the receiver of the present invention, the received signal actually includes an I phase component signal and a Q phase component signal. Moreover, the spreading code usually includes an I phase component code and a Q phase component code. For the matched filter 4' and the matched filter 4", as shown in FIG. 9, the correlating operation is considered to be performed by a first matched filter 4' or 4" for receiving the input of I phase component signal and I phase component code and performing the product sum operation to output the correlation output, a second matched filter 4' or 4" for receiving the input of I phase component signal and Q phase component code and performing the product sum operation to output the correlation output, a third matched filter 4' or 4" for receiving the input of Q phase component signal and I phase component code and performing the product sum operation to output the correlation output, a fourth matched filter 4' or 4" for receiving the input of Q phase component signal and Q phase component code and performing the product sum operation to output the correlation output, two adders 61, and a power operator 62. FIG. 9 is a constitution block diagram showing the constitution example of the matched filter for obtaining the correlation output when there are I phase component signal and Q phase component signal in the synchronous circuit and the receiver of the present invention.

In this case, each of two adders 61 performs the addition of the correlation output outputted by the first matched filter and the correlation output outputted by the fourth matched filter, and the addition of the correlation output outputted by the second matched filter and the correlation output outputted by the third matched filter.

Moreover, the power operator 62 calculates a square sum from the addition results outputted by two adders 61 and outputs the square sum.

Furthermore, in the synchronous circuit and receiver of the present invention, since the long code of a descending control channel for each base station is predetermined, the spreading code generated by the spreading code generator may be written beforehand in the memory or the like.

Specifically, by writing the long code to the memory during the manufacture of the synchronous circuit and receiver of the present invention, the spreading code generator may only output the long code read from the memory, so that the circuit can further be simplified.

In this case, however, it is preferable to update the system and rewrite the spreading code stored in the memory later, so that even the code change can be handled.

According to the synchronous circuit and receiver of the embodiment of the present invention, since the group short code, and the long code can be specified in a short time, averaging over several frames can effectively be performed even under an environment in which the received signal is deteriorated by phasing or the like.

In this case, the processing time slightly increases, but the long code can be specified in a short time as compared with the conventional art.

According to the present invention, there is provided the synchronous circuit which performs the correlating operation of the received signal and the spreading code to perform the communication. When the received long code mask symbol is specified with the long code, the symbol remains to be held over a given time, the candidates for a plurality of spreading codes are successively selected, and the correlation of the selected spreading code and the held long code mask symbol is successively calculated. Therefore, once the signal is received, the used spreading code can be specified by successively calculating the correlation with the candidates for the spreading codes, so that the time required until the long code for use in communication is specified can effectively and remarkably be reduced.

Moreover, in the synchronous circuit according to the present invention, when the group short code is specified, to specify the long code as the spreading code for use in communication, a part of the signal diffused with the long code remains to be held over the given time among the received signals, the phase is changed with respect to each of a plurality of long codes belonging to the group indicated by the group short code, and the correlation with the held pilot signal is successively calculated. Therefore, once the pilot signal is received, the used spreading code can be specified by successively calculating the correlation with the candidate for the spreading code, which provides an effect that the time for specifying the long code for use in communication can remarkably shortened.

Furthermore, according to the present invention, the radio unit converts the signal coming in the antenna to the base band signal, the A/D converter converts the signal to the digital signal, and the control unit outputs the data stop signal to the matched filter to stop the data storage at the timing when the second long code mask symbol received with the same phase as that of the first long code mask symbol is completely received, and successively designates the candidates for a plurality of group short codes to the spreading code generator, so that the matched filter continues to hold the data of the second long code mask symbol. The candidate for the group short code inputted from the spreading code generator and the data of the second long code mask symbol are successively subjected to the product sum operation to output the correlation signal. The control unit checks the correlation signal, obtains the correlation, and specifies the group short code to stop the output of the data stop signal. Furthermore, at the timing when the signal diffused with the long code received with the phase immediately after the first long code mask symbol is completely received, the control unit outputs the data stop signal to the matched filter to stop the data storage, and successively designates a plurality of long codes belonging to the group indicated by the group short code specified in the spreading code generator to the spreading code generator by changing the phase with respect to each long code, so that the matched filter continues to hold the data of the pilot symbol. The product sum operation of each long code inputted from the spreading code generator and started from each phase and the held pilot symbol data is successively performed to output the correlation signal. The control unit checks the correlation signal, obtains the correlation, and specifies the long code for use in communication in the synchronous circuit. Therefore, the matched filter holds the second long code mask symbol and the signal diffused with the long code and performs the product sum operation with each spreading code. Once each signal is received, the correlation with the candidate for the spreading code is successively calculated, and the used spreading code can be specified, which provides an effect that the time can remarkably be shortened until the long code for use in communication is specified.

Additionally, according to the present invention, in the above-described synchronous circuit, to specify the spreading code for use from a plurality of candidates, the control unit divides all spreading codes as the candidates with a specific length, and sets one synthesized and obtained spreading code to the spreading code generator. The matched filter performs the product sum operation of the digital signal data inputted from the A/D converter and the synthesized spreading code, calculates the partial correlation, and outputs the correlation signal, so that the correlation can be detected by one product sum operation without successively specifying the spreading code. This provides an effect that time can further be reduced until the long code for use in communication is specified.

Moreover, according to the present invention, to specify the spreading code for use from a plurality of candidates in the above-described synchronous circuit, the control unit divides the spreading code as the candidate into a plurality of sets, divides the spreading code of each set with the specific length, and sets one synthesized and obtained spreading code to the spreading code generator. The matched filter performs the product sum operation of the digital signal data inputted from the A/D converter and the synthesized spreading code, calculates the partial correlation, and outputs the correlation signal. Therefore, when the correlation value of the partial correlation is reduced by dividing all the codes, by enlarging the division width to increase the frequency of the product sum operations, the correlation can be detected only by several product sum operations without successively designating the spreading code. Therefore, the time until the long code for use in communication is specified is shortened, while the correlation can securely and effectively be detected.

Furthermore, according to the present invention, there is provided the receiver which has a plurality of data memories for detecting a plurality of delayed incoming path timings based on the received signal and storing the signal received from each path timing as the digital signal data, and the inner product unit for despreading the data stored in each of the plurality of data memories in the time division manner in response to the instruction. Therefore, by holding each path data once, and performing the despreading in the time division manner, the despreading of each path can be performed by either one or all of at least one matched filter sliding correlator, and inner product unit. The RAKE synthesis can be realized without increasing the number of matched filters, sliding correlators, or inner product units, the circuit scale is reduced, and the power consumption can effectively be curtailed.

Additionally, according to the present invention, the receiver is provided with two radio units for receiving the signals coming in the corresponding antennas and outputting the base band signals; the A/D converter disposed for each radio unit for converting the base band signal inputted from the corresponding radio unit to the digital signal; the profile means disposed for each A/D converter for despreading the digital signal inputted from the corresponding A/D converter in accordance with the spreading code outputted by the spreading code generator to generate the delay profile, and holding the digital signal outputted from the A/D converter from a plurality of path position timings specified by the delay profile; the control unit for changing the change-over switch to select one profile means in a time division manner at a given interval; the inner product unit for successively performing the product sum operation of the digital signals held by the profile means selected by the change-over switch and corresponding to a plurality of paths and the spreading code inputted from the spreading code generator and outputting the signal; and the RAKE synthesizing unit for RAKE-synthesizing the signal inputted from the inner product unit. Therefore, by holding each path data once, and performing the despreading in the time division manner, the despreading of each path can be performed by at least one inner product unit. Without increasing the number of inner product units, the RAKE synthesis is realized, the circuit scale is reduced, and the power consumption can effectively be reduced.

Moreover, according to the present invention, the matched filter has a plurality of sample hold circuits connected to multiple stages for successively transmitting the data successively inputted from the A/D converter to the subsequent stage and storing the data; the switch for outputting the digital signal outputted by the A/D converter to the front-stage sample hold circuit among the sample hold circuits while no input of the data stop signal for stopping the data taking is received from the control unit, and outputting the digital signal outputted by the rearmost-stage sample hold circuit to the front-stage sample hold circuit among the sample hold circuits while the input of the data stop signal is received; the multipliers disposed for the sample hold circuits for performing the multiplication with the corresponding spreading code inputted from the spreading code generator and outputting the result; and one adder for adding the multiplication result signals inputted from the multipliers and outputting the result. In the synchronous circuit provided with the matched filter, at the timing when the pilot symbol received with the phase immediately after the first long code mask symbol is completely received, the control unit outputs the data stop signal to the matched filter, and successively sets the long codes belonging to the group indicated by the specified group short code to the spreading code generator. The matched filter continues toehold the pilot symbol, successively changes the phase of the pilot symbol, performs the product sum operation with the spreading code inputted from the spreading code generator, and outputs the correlation signal. The synchronous circuit has an effect that the time until the long code for use in communication is specified can remarkably be reduced with a simple circuit.

What is claimed is:

1. A synchronous circuit for performing correlating operations on a received signal and generating a spreading code to perform communication, the synchronous circuit comprising:

when a long code is specified, means for holding a received long code mask symbol over a constant time, means for successively selecting candidates for a plurality of spreading codes, and means for successively calculating a correlation between the selected spreading code and the held long code mask symbol and, when the correlation is obtained, the long code having obtained the correlation is specified as the long code for use in communication.

2. A synchronous circuit responsive to a specified group short code for specifying a long code as a spreading code for use in communication, the synchronous circuit comprising:

means for holding a part of a signal diffused with the long code among received signals over a constant time, means for changing a phase with respect to each of a plurality of long codes belonging to a group indicated by said group short code, and means for successively calculating correlation with a held pilot signal, and when the correlation is obtained, the long code having obtained the correlation is specified as the long code for use in communication.

3. A synchronous circuit which comprises:

a radio unit for converting a signal coming in an antenna to a base band signal;

an A/D converter for converting the signal inputted from said radio unit to a digital signal;

a spreading code generator for generating a set spreading code;

a matched filter for outputting a correlation signal from the digital signal inputted from said A/D converter and the spreading code inputted from said spreading code generator; and a control unit for controlling each unit, wherein said matched filter comprises:

a plurality of sample hold circuits connected to multiple stages for successively transmitting data successively inputted from said A/D converter to a subsequent stage and storing the data, stopping storage of newly inputted data and continuing to hold the data held at the time while input of a data stop signal for stopping the data storage is received from said control unit;

multipliers disposed for said sample hold circuits for performing multiplication with the corresponding spreading code inputted from said spreading code generator to transmit an output; and one adder for adding multiplication result signals inputted from said multipliers to transmit an output, upon correlation/detection of a first long code mask symbol, at a timing when reception of a second long code mask symbol received with the same phase as that of the first long code mask symbol is completed, said control unit outputs the data stop signal to said matched filter, successively sets candidates for a plurality of group short codes to said spreading code generator, checks the correlation signals outputted by said matched filter with respect to the plurality of group short codes, determines that correlation is obtained, and stops the output of said data stop signal, and at a timing when the reception of a symbol diffused with a long code received with the phase immediately after said first long code mask symbol is completed, the control unit outputs the data stop signal to said matched filter, successively sets a plurality of long codes belonging to a group indicated by the group short code to said spreading code generator by changing the phase with respect to each long code, checks the correlation signals outputted by said matched filter with respect to the plurality of long codes started from a plurality of phases, determines that the correlation is obtained, and specifies the long code having obtained the correlation as the long code for use in communication.

4. A synchronous circuit which comprises:

a radio unit for converting a signal coming in an antenna to a base band signal;

an A/D converter for converting the signal inputted from said radio unit to a digital signal;

a spreading code generator for generating a set spreading code;

a matched filter for outputting a correlation signal from the digital signal inputted from said A/D converter and the spreading code inputted from said spreading code generator; and a control unit for controlling each unit, wherein said matched filter comprises:

a memory for holding digital signal data inputted from said A/D converter over recent one symbol time, and continuing to hold the data held at the time while receiving input of a data stop signal for stopping data taking from said control unit; and a product sum operator for performing product sum operation of the data stored in said memory and the spreading code inputted from said spreading code generator with a matched phase, upon correlation/detection of a first long code mask symbol, at a timing when reception of a second long code mask symbol received with the same phase as that of the first long code mask symbol is completed, said control unit outputs the data stop signal to said matched filter, successively sets candidates for a plurality of group short codes to said spreading code generator, checks the correlation signals outputted by said matched filter with respect to the plurality of group short codes, determines that correlation is obtained, and stops the output of said data stop signal, and at a timing when the reception of a symbol diffused with the long code received with the phase immediately after said first long code mask symbol is completed, the control unit outputs the data stop signal to said matched filter, successively sets a plurality of long codes belonging to a group indicated by the group short code to said spreading code generator by changing the phase with respect to each long code, checks the correlation signals outputted by said matched filter with respect to the plurality of long codes started from a plurality of phases, determines that the correlation is obtained, and specifies the long code having obtained the correlation as the long code for use in communication.

5. The synchronous circuit according to claim 3 wherein when the spreading code for use is specified from the plurality of candidates, the control unit divides all said spreading codes as said candidates with a specific length, selects and synthesizes one spreading code from all the divided spreading codes, and sets the synthesized and obtained spreading code to the spreading code generator, and the matched filter performs the product sum operation of the digital signal data inputted from the A/D converter and the synthesized spreading code, calculates a partial correlation, and outputs the correlation signal.

6. The synchronous circuit according to claim 4 wherein when the spreading code for use is specified from the plurality of candidates, the control unit divides all said spreading codes as said candidates with a specific length, selects and synthesizes one spreading code from all the divided spreading codes, and sets the synthesized and obtained spreading code to the spreading code generator, and the matched filter performs the product sum operation of the digital signal data inputted from the A/D converter and the synthesized spreading code, calculates a partial correlation, and outputs the correlation signal.

7. The synchronous circuit according to claim 3 wherein when the spreading code for use is specified from the plurality of candidates, the control unit divides the spreading codes as said candidates into a plurality of sets, divides all said spreading codes of each set into specific lengths, selects and synthesizes one spreading code from said divided spreading codes, and sets the synthesized and obtained spreading code to the spreading code generator, and the matched filter performs the product sum operation of the digital signal data inputted from the A/D converter and the synthesized spreading code, calculates a partial correlation, and outputs the correlation signal.

8. The synchronous circuit according to claim 4 wherein when the spreading code for use is specified from the plurality of candidates, the control unit divides the spreading codes as said candidates into a plurality of sets, divides all said spreading codes of each set into specific lengths, selects and synthesizes one spreading code from said divided spreading codes, and sets the synthesized and obtained spreading code to the spreading code generator, and the matched filter performs the product sum operation of the digital signal data inputted from the A/D converter and the synthesized spreading code, calculates a partial correlation, and outputs the correlation signal.

9. A receiver which comprises:

a plurality of data memories for detecting timings of a plurality of delayed incoming paths based on a received signal, and storing a signal received from the timing of each path as digital signal data; and means for despreading the data stored in each of said plurality of data memories in a time division manner, wherein either one of a matched filter, a sliding correlator, and an inner product unit is selectively used as the means, or all of the matched filter, the sliding correlator, and the inner product unit are used as the means.

10. A receiver which comprises:

a plurality of radio units provided with a plurality of antennas and disposed for said plurality of antennas for receiving signals coming in the corresponding antennas, and outputting base band signals;

a plurality of A/D converters disposed for said radio units for converting the base band signals outputted from the corresponding radio units to digital signals;

a spreading code generator for generating a spreading code;

a plurality of memory disposed for said A/D converters for despreading the received signals in accordance with the spreading code inputted from said spreading code generator to generate delay profiles, and holding the signals outputted by said A/D converters from timings of a plurality of path positions specified by the delay profiles;

a change-over switch for selecting one memory from said plurality of memory;

a control unit for changing said change-over switch at a constant interval in a time division manner;

an inner product unit for successively performing product sum operation of the signals held by the memory selected by said change-over switch and the spreading code inputted from said spreading code generator; and a RAKE synthesizing unit for RAKE-synthesizing the signals inputted from said inner product unit.

11. A synchronous circuit which comprises:

a radio unit for converting a signal coming in an antenna to a base band signal;

an A/D converter for converting the signal inputted from said radio unit to a digital signal;

a spreading code generator for generating a set spreading code;

a matched filter for outputting a correlation signal from the digital signal inputted from said A/D converter and the spreading code inputted from said spreading code generator; and a control unit for controlling each unit, wherein said matched filter comprises:

a plurality of sample hold circuits connected to multiple stages for successively transmitting data successively inputted from said A/D converter to a subsequent stage in a chip unit and storing the data;

a switch for outputting the digital signal outputted by said A/D converter to a front-stage sample hold circuit among said sample hold circuits while receiving no input of data stop signal for stopping data taking from said control unit, and for outputting the digital signal outputted by a rearmost-stage sample hold circuit among said sample hold circuits to said front-stage sample hold circuit in a chip unit while receiving the input of said data stop signal, to successively change phase of the data stored in said sample hold circuit;

multipliers disposed for said sample hold circuits for performing multiplication with the corresponding spreading code inputted from said spreading code generator; and one adder for adding and outputting multiplication result signals inputted from said multipliers, upon correlation/detection of a first long code mask symbol, at a timing when reception of a second long code mask symbol received with the same phase as that of the first long code mask symbol is completed, said control unit outputs the data stop signal to said matched filter, successively sets candidates for a plurality of group short codes to said spreading code generator, checks the correlation signals outputted by said matched filter with respect to the plurality of group short codes, determines that correlation is obtained, stops the output of said data stop signal, and at a timing when reception of a pilot symbol received with the phase immediately after said first long code mask symbol is completed, the control unit outputs the data stop signal to said matched filter, successively sets a plurality of long codes belonging to a group indicated by the group short code to said spreading code generator, checks the correlation signals inputted from said matched filter with respect to the plurality of long codes for each phase of said pilot signal, determines that the correlation is obtained, and specifies the long code having obtained the correlation as the long code for use in communication.

* * * * *